United States Patent
Aoki et al.

(10) Patent No.: US 8,155,837 B2
(45) Date of Patent: Apr. 10, 2012

(54) OPERATING DEVICE ON VEHICLE'S STEERING WHEEL

(75) Inventors: Tazuko Aoki, Toyota (JP); Hitoshi Kumon, Aichi-gun (JP); Tadahiro Kashiwai, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 744 days.

(21) Appl. No.: 12/298,632

(22) PCT Filed: Apr. 20, 2007

(86) PCT No.: PCT/IB2007/001030
§ 371 (c)(1),
(2), (4) Date: Oct. 27, 2008

(87) PCT Pub. No.: WO2007/122479
PCT Pub. Date: Nov. 1, 2007

(65) Prior Publication Data
US 2009/0164062 A1 Jun. 25, 2009

(30) Foreign Application Priority Data
Apr. 25, 2006 (JP) .................. 2006-120983

(51) Int. Cl.
*B62D 6/00* (2006.01)
(52) U.S. Cl. .......... 701/41; 345/173; 345/184; 340/665; 701/36
(58) Field of Classification Search ............ 701/41, 701/36; 382/103; 345/173, 156; 346/173; 473/202
See application file for complete search history.

(56) References Cited

U.S. PATENT DOCUMENTS

| | | | | |
|---|---|---|---|---|
| 4,306,218 A | * | 12/1981 | Leconte et al. | 340/468 |
| 5,767,466 A | * | 6/1998 | Durrani | 200/61.54 |
| 5,916,288 A | | 6/1999 | Hartman | |
| 5,965,952 A | * | 10/1999 | Podoloff et al. | 307/10.1 |
| 6,373,472 B1 | * | 4/2002 | Palalau et al. | 345/173 |
| 6,403,900 B2 | * | 6/2002 | Hecht et al. | 200/61.54 |
| 6,762,693 B2 | * | 7/2004 | Wand | 340/870.13 |
| 6,803,533 B2 | * | 10/2004 | Bonn et al. | 200/61.55 |

(Continued)

FOREIGN PATENT DOCUMENTS
CN 101432166 A * 5/2009
(Continued)

OTHER PUBLICATIONS

Ken Hinckley and Mike Sinclair, "Touch-Sensing Input Devices," To Appear in ACM CHI'99 Conf. On Human Factors in computing Systems.*

(Continued)

*Primary Examiner* — Cuong H Nguyen
(74) *Attorney, Agent, or Firm* — Oblon, Spivak, McClelland, Maier & Neustadt, L.L.P.

(57) ABSTRACT

An operating device includes a plurality of steering wheel switches provided on a steering wheel, a display part in which function icons representing functions of the steering wheel switches are arranged in the substantially same layout as the steering wheel switches, and a contact detection device for detecting contact or access by the driver's thumb with respect to the steering wheel switches. If the contact detection device detects the contact or access by the driver's thumb with respect to one of the steering wheel switches, the function icon associated with the one steering wheel switch is highlighted.

25 Claims, 17 Drawing Sheets

U.S. PATENT DOCUMENTS

| | | | | |
|---|---|---|---|---|
| 6,961,644 | B2 * | 11/2005 | Mercier et al. | 701/36 |
| 7,176,885 | B2 * | 2/2007 | Troxell et al. | 345/156 |
| 7,233,313 | B2 * | 6/2007 | Levin et al. | 345/156 |
| 7,256,770 | B2 * | 8/2007 | Hinckley et al. | 345/173 |
| 7,358,956 | B2 * | 4/2008 | Hinckley et al. | 345/156 |
| 7,362,231 | B2 * | 4/2008 | Bos | 340/665 |
| 7,370,983 | B2 * | 5/2008 | DeWind et al. | 359/844 |
| 7,466,843 | B2 * | 12/2008 | Pryor | 382/103 |
| 7,489,303 | B1 * | 2/2009 | Pryor | 345/173 |
| 7,602,382 | B2 * | 10/2009 | Hinckley et al. | 345/173 |
| 7,898,530 | B2 * | 3/2011 | Trachte | 345/173 |
| 2001/0011995 | A1 * | 8/2001 | Hinckley et al. | 345/156 |
| 2001/0015718 | A1 * | 8/2001 | Hinckley et al. | 345/156 |
| 2003/0023353 | A1 | 1/2003 | Badarneh | |
| 2004/0100440 | A1 * | 5/2004 | Levin et al. | 345/156 |
| 2004/0119688 | A1 * | 6/2004 | Troxell et al. | 345/156 |
| 2005/0064936 | A1 * | 3/2005 | Pryor | 463/36 |
| 2005/0275637 | A1 * | 12/2005 | Hinckley et al. | 345/173 |
| 2005/0276448 | A1 * | 12/2005 | Pryor | 382/103 |
| 2006/0047386 | A1 | 3/2006 | Kanevsky et al. | |
| 2009/0164062 | A1 * | 6/2009 | Aoki et al. | 701/36 |

FOREIGN PATENT DOCUMENTS

| | | | |
|---|---|---|---|
| EP | 1 085 402 | | 3/2001 |
| EP | 2010411 | A2 * | 1/2009 |
| JP | 5 77679 | | 3/1993 |
| JP | 10-308136 | | 11/1998 |
| JP | 2003 63326 | | 3/2003 |
| JP | 2003 131791 | | 5/2003 |
| JP | 2003 175783 | | 6/2003 |
| JP | 2003 260988 | | 9/2003 |
| JP | 2003 531046 | | 10/2003 |
| JP | 2004 251756 | | 9/2004 |
| JP | 2004 345549 | | 12/2004 |
| JP | 2005-119540 | | 5/2005 |
| JP | 2007-106353 | | 4/2007 |
| JP | 2007290562 | A * | 11/2007 |
| WO | 98 09848 | | 3/1998 |
| WO | WO 2007122479 | A2 * | 11/2007 |

OTHER PUBLICATIONS

Thomas G. Zimmerman et al., "Applying Electric Field Sensing to Human-Computer Interfaces," CHI '95 Mosaic of Creativity, May 7-11, 1995, pp. 280-287.*

Development of a sensor system for grasp behavior on a steering wheel; Imamura, T.; Zhong Zhang; Miyake, T.; bin Othman, M.R.; Systems, Man and Cybernetics, 2009. SMC 2009. IEEE International Conference on; Digital Object Identifier: 10.1109/ICSMC.2009.5345935; Publication Year: 2009 , pp. 250-254.*

Unobtrusive in-vehicle biosignal instrumentation for advanced driver assistance and active safety; Heuer, S.; Chamadiya, B.; Gharbi, A.; Kunze, C.; Wagner, M.; Biomedical Engineering and Sciences (IECBES), 2010 IEEE EMBS Conference on Digital Object Identifier: 10.1109/IECBES.2010.5742238; Publication Year: 2010 , pp. 252-256.*

The Haptic steering Wheel: Vibro-tactile based navigation for the driving environment; Sungjae Hwang; Jung-hee Ryu; Pervasive Computing and Communications Workshops (PERCOM Workshops), 2010 8th IEEE International Conference on Digital Object Identifier: 10.1109/PERCOMW.2010.5470517; Publication Year: 2010 , pp. 660-665.*

Physiological parameters variation during driving simulations; Zocchi, C.; Rovetta, A.; Fanfulla, F.; Advanced intelligent mechatronics, 2007 IEEE/ASME international conference on; Digital Object Identifier: 10.1109/AIM.2007.4412503 Publication Year: 2007 , pp. 1-6.*

Developing Ubiquitous Multi-touch Sensing and Displaying Systems with Vision-Based Finger Detection and Event Developing Ubiquitous Multi-touch Sensing and Displaying Systems w/ Vision-Based Finger Detection & Event Identification TechniquesChen, Yen-Lin et al.; High Performance Computing and Communications, 2011 IEEE 13th Inter. Conf. pp. 898-903.*

Detecting hands, fingers and blobs for multi-touch display applications; de F.O. Araujo, T.; Lima, A.M.N.; dos Santos, A.J.V.; High Performance Computing & Simulation, 2009. HPCS '09. International Conference on; Digital Object Identifier: 10.1109/HPCSIM.2009.5192305; Publication Year: 2009 , pp. 237-243.*

Design and implementation of multi-touch system using FTIR technique for optimization of finger touch detection Ahsanullah; Mahmood, A.K.B.; Sulaiman, S.; Information Technology (ITSim), 2010 International Symposium in vol. 1; Digital Object Identifier: 10.1109/ITSIM.2010.5561308; Publication Year: 2010 , pp. 1-7.*

Research design for evaluation of finger input properties on multi-touch screen; Ahsanullah; Mahmood, A.K.B.; Sulaiman, S.; Khan, M.; Information and Communication Technologies (ICICT), 2011 International Conference on; Digital Object Identifier: 10.1109/ICICT.2011.5983553; Publication Year: 2011 , pp. 1-6.*

Anonymous: "Eyes forward—Driver Systems Control and Display", Research Disclosure, Mason Publications, vol. 361, No. 1, XP007119729, (1994).

* cited by examiner

OPERATING DEVICE ON VEHICLE'S STEERING WHEEL

BACKGROUND OF THE INVENTION

1. Field of the Invention

The present invention relates to an operating device having a plurality of steering wheel switches provided on a steering wheel.

2. Description of the Related Art

Vehicle-mounted equipment operating switches called "steering wheel switches" are well known in the art. These switches are provided on a spoke portion of a steering wheel so that a driver holding the steering wheel can operate them with the thumb, thereby enabling the driver to conduct various operations for the vehicle-mounted equipment without having to remove his or her hands from the steering wheel while a motor vehicle is moving.

As one example of this kind of operating device, there is conventionally known a vehicle-mounted display device that includes an operation input device having a plurality of operating parts arranged on a steering wheel in the passenger compartment, a display unit for displaying various kinds of information, an option menu database storage device for storing an option menu database inclusive of option menu information regarding a list of processing commands according to the operation of the respective operating parts of the operation input device, and a display control unit responsive to the operation of the operating parts of the operation input means for reading out the option menu database stored in the option menu database storage device to allot the processing commands included in an option menu to the respective operating parts and for causing the display device to display the corresponding relationship between the processing commands included in the option menu and the respective operating parts (See, e.g., Japanese Patent Application Publication No. JP-A-2003-131791).

In addition, a vehicle-mounted equipment operating system in which an electrode for sensing the contact of the driver's thumb with steering wheel switches is provided in order for a driver to visually recognize the positions and kinds of the switches without turning his or her eyes from the front of a vehicle (a distant view field) to a steering wheel (a nearby view field) to operate the switches. If the contact is sensed, individual operation items corresponding to the respective steering wheel switches are displayed on a head-up display and the operation item associated with the currently touched switch is highlighted as by reversed display, thereby informing the driver of the operation item corresponding to the position of his or her thumb with no need for the driver to directly look at the steering wheel switches (See, e.g., Japanese Patent Application Publication No. JP-A-2003-175783).

However, the arrangement disclosed in Japanese Patent Application Publication No. JP-A-2003-131791 is inconvenient to use, because it is necessary for the driver to judge the size of the switch by touch, or operate the switch on a trial basis, or look at the switch, in order to make determination as to which steering wheel switch is currently touched by the thumb. On the other hand, with the arrangement taught in Japanese Patent Application Publication No. JP-A-2003-175783, the driver can discriminate the steering wheel switch currently touched by the thumb without having to directly look at the switch. Without the looking directly at the steering wheel, however, it is impossible for the driver to learn the current positional relationship between the thumb and the rest of the steering wheel switches. For this reason, when the driver wishes to operate other steering wheel switches than the one currently touched by the thumb, there is a need for the driver to directly look at the layout of the steering wheel switches. This inconveniences the driver.

SUMMARY OF THE INVENTION

The present invention provides an operating device having a plurality of steering wheel switches, which enables a driver to readily learn the positional relationship between a thumb and each of the steering wheel switches.

According to a first aspect of the invention, the operating device includes a plurality of steering wheel switches provided on a steering wheel; a display part in which function icons representing functions of the steering wheel switches are arranged in the substantially same layout as the steering wheel switches; and a contact detection device for detecting contact or access of the driver's finger (normally, thumb) with respect to the steering wheel switches, wherein, if the contact or access of the driver's finger with respect to one of the steering wheel switches is detected by the contact detection device, the function icon associated with the one steering wheel switch is highlighted.

A second aspect of the invention is similar to the operating device of the first aspect, except that the function icons comprise icons displayed in a variably controllable condition, and wherein the function icon associated with the steering wheel switch for which the contact or access of the finger is detected, is enlarged when displayed. According to this aspect of the invention, the function icons associated with the steering wheel switches are easily visible, and the driver can easily comprehend that his or her finger is currently touching the steering wheel switch.

A third aspect of the invention is similar to the operating device of the first or second aspects, except that the function icons comprise icons displayed in a variably controllable condition, wherein the function icons comprise generic function icons assigned, in a one-to-one correspondence, to switch groups each comprised of a plurality of the steering wheel switches, each of the generic function icons showing a representative function of the steering wheel switches belonging to the same switch group, wherein the function icons are arranged in the substantially same layout as the switch groups, and wherein, if the contact or access of the driver's finger with respect to one of the steering wheel switches belonging to one of the switch groups is detected by the contact detection device, the function icon associated with the one switch group changes from the generic function icon to an individual function icon representing functions of the steering wheel switches belonging to the selected switch group. According to this aspect of the invention, even if the steering wheel switches are arranged in multiple numbers, it is possible to prevent the function icons from being complicated, while enabling the driver to see individual functions of the steering wheel switches, if needed. Moreover, by highlighting the function icons through the conversion from the generic function icon to the individual function icon, the driver can readily determine the switch group on which the driver's finger is currently placed.

A fourth aspect of the invention is similar to the operating device of the third aspect, wherein each of the switch groups is formed by densely arranging a plurality of the steering wheel switches associated with the same or related application. According to this aspect of the invention, the driver can continuously activate the steering wheel switches of the same or relevant application with no need to broadly move the finger. Furthermore, by just touching one of the steering wheel switches belonging to the desired switch group, it is possible to display the individual function icons of the steering wheel switches of the selected switch group. This enables the driver to readily comprehend the functions and positions of the respective steering wheel switches associated with the same or relevant application.

A fifth aspect of the invention is similar to the operating device of the third or fourth aspects, except that the individual function icon has function-identifying subdivisions representing the functions of the steering wheel switches in substantially the same layout as the corresponding steering wheel switches. According to this aspect of the invention, the driver can comprehend the actual positions of the respective steering wheel switches by relying upon the layout of the function-identifying subdivisions of the respective steering wheel switches but without the need to look at the steering wheel.

A sixth aspect of the invention is similar to the operating device of the fifth aspect, except that the individual function icon is configured such that the function-identifying subdivision corresponding to the steering wheel switch for which the contact or access of the driver's finger, which has been detected by the contact detection device, is highlighted. According to this aspect of the invention, the driver can comprehend the position of the selected steering wheel switch by relying upon the positional relationship between the highlighted function-identifying subdivision and the desired function-identifying subdivision but without having to look at the steering wheel.

A seventh aspect of the invention is similar to the operating device of the first aspect, except that the function icons comprise icons displayed in a variably controllable condition, and that the function icon associated with the steering wheel switch for which the contact or access of the finger is detected is differently highlighted when the contact or access of the driver's finger is detected with respect to one of the steering wheel switches and when the contact or access of the driver's finger is detected with respect to two or more of the steering wheel switches. According to this aspect of the invention, the driver can comprehend that the finger is placed in a position for operation of two or more of the steering wheel switches, without having to look at the steering wheel. Thus, it becomes possible to avoid a situation that the driver activates the incorrect steering wheel switch together with the steering operation of the steering wheel.

An eighth aspect of the invention is similar to the operating device of any one of the third to sixth aspects, except that the function icons comprise icons displayed in a variably controllable condition, and that the function icon associated with the steering wheel switch for which the contact or access of the driver's finger is detected is differently highlighted when the contact or access of the driver's finger is detected with respect to one of the steering wheel switches and when the contact or access of the driver's finger is detected with respect to two or more of the steering wheel switches belonging to two or more of the switch groups. According to this aspect of the invention, the driver can comprehend that the finger is placed in a position for operation of two or more of the steering wheel switches belonging to two or more of the switch groups, without having to look at the steering wheel. Thus, it becomes possible to avoid a situation that the driver activates the incorrect steering wheel switch together with the steering operation of the steering wheel.

A ninth aspect of the invention is similar to the operating device of any one of the first to eighth aspects, except that the contact detection device is provided on an operating member of each of the steering wheel switches in a one-to-one correspondence relationship with the steering wheel switches.

According to this aspect of the invention, it is possible to densely arrange a multiple of the steering wheel switches.

A tenth aspect of the invention is similar to the operating device of the first aspect, except that the contact detection device is provided adjacent to an operating member of each of the steering wheel switches in a one-to-one correspondence relationship with the steering wheel switches. According to this aspect of the invention, there is no need to arrange the contact detection device on the movable operating member, thus making the contact detection device less costly and simplifying the electric wiring line.

An eleventh aspect of the invention is similar to the operating device of the tenth aspect, except that the contact detection device adjoins a corresponding one of the steering wheel switches at the periphery of the steering wheel. According to this aspect of the invention, when the driver touches one of the steering wheel switches, the probability that the contact detection device corresponding thereto will be touched is increased. This makes it possible to enhance the contact detection accuracy of the contact detection device with a simplified configuration.

A twelfth aspect of the invention is similar to the operating device of the tenth or eleventh aspects, except that the function icon associated with the steering wheel switch for which the contact or access of the driver's finger is detected is highlighted by turning on an indicator provided adjacent to the function icon. According to this aspect of the invention, the driver can easily comprehend the relationship between the current position of the driver's finger and the positions of the respective steering wheel switches, with a simplified configuration.

A thirteenth aspect of the invention is similar to the operating device of the twelfth aspects, except that the indicator associated with the steering wheel switch for which the contact or access of the driver's finger is detected is differently turned on when the contact or access of the driver's finger is detected with respect to one of the steering wheel switches and in case of detecting the contact or access of the finger with respect to two or more of the steering wheel switches. According to this aspect of the invention, it becomes possible, with a simplified configuration, to avoid a situation that the driver activates the incorrect steering wheel switch together with the steering operation of the steering wheel.

A fourteenth aspect of the invention is similar to the operating device of any one of the seventh, eighth and thirteenth aspects, except that, when the contact or access of the driver's finger is detected with respect to two or more of the steering wheel switches, activation of the steering wheel switches for which the contact or access of the driver's finger is detected is nullified. According to this aspect of the invention, it becomes possible, with a simplified configuration, to avoid a situation that the driver activates the incorrect steering wheel switch together with the steering operation of the steering wheel.

According to a fifteenth aspect of the invention, the operating device includes an operation device having a plurality of switches and provided in the passenger compartment; a display part in which function icons representing functions of the switches are arranged in the substantially same layout as the switches; a contact detection device for detecting contact or access of the driver's finger to the switches; and a display control unit, if the contact or access of the driver's finger to one of the switches is detected by the contact detection means, for controlling the display part to highlight the function icon associated with the one switch.

A sixteenth aspect of the invention is similar to the operating device of the fifteenth aspect, except that the function icons includes generic function icons assigned, in one-to-one correspondence, to switch groups, each of switch groups comprised of a plurality of the switches and each of the generic function icons showing a representative function of the steering wheel switches belonging to the same switch group, wherein the function icons are arranged in the substantially same layout as the switch groups, and wherein, if the contact or access of the driver's finger on one of the switches belonging to one of the switch groups is continuously detected for a given time by the contact detection means, the display control means controls the display part to change the function icon associated with the one switch group from the generic function icon to an individual function icon representing functions of the switches belonging to the one switch group.

A seventeenth aspect of the invention is similar to the operating device of the sixteenth aspect, except that the display control means controls the display part to differently highlight the function icon associated with the switch, for which the contact or access of the finger is detected, when the contact or access of the finger to a single switch is detected and when the contact or access of the finger to two or more of the switches is detected.

BRIEF DESCRIPTION OF THE DRAWINGS

The above and other objects and features of the present invention will become apparent from the following description of preferred embodiment, given in conjunction with the accompanying drawings, in which.

DETAILED DESCRIPTION OF THE PREFERRED EMBODIMENTS

Hereinafter, embodiments of the invention will be described with reference to the accompanying drawings.

Figure 1:
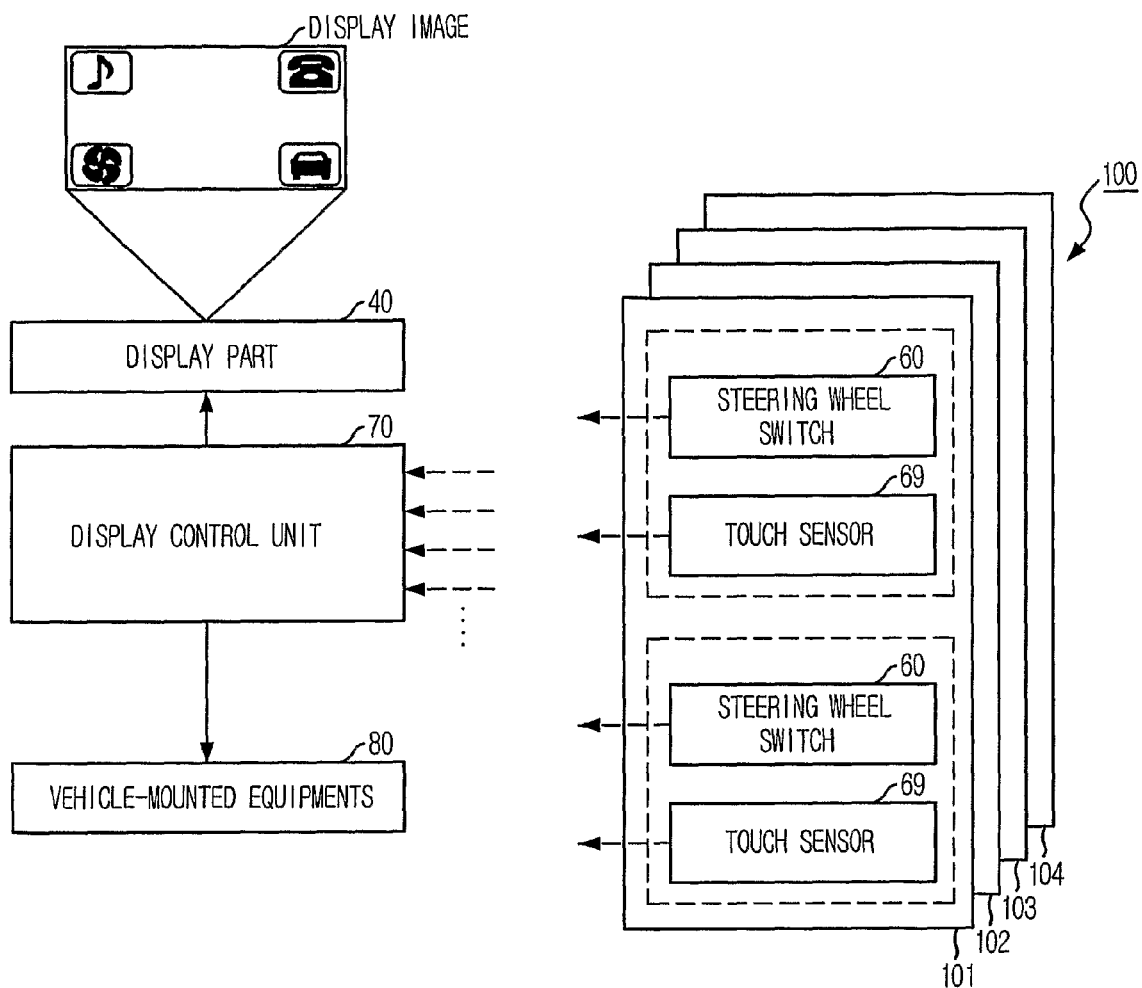
FIG. 1 is a schematic function-based block diagram showing one example of a major configuration of an operating device in accordance with a first embodiment of the present invention.

FIG. 1 is a function-based block diagram showing one example of a major configuration of an operating device in accordance with a first embodiment of the present invention. As shown in FIG. 1, an operating device of the present embodiment includes an operating part 100, a display control unit 70 and a display part 40 for displaying an operation menu image that assists a driver in operating the operating part 100. The operation menu image will be described in detail later.

The display control unit 70 is mainly formed of a microcomputer. That is, the display control unit 70 includes a CPU for executing a variety of processing tasks in accordance with a given operating program, a memory (e.g., a ROM, a RAM, an EEPROM or the like) for storing the operating program, an image data, an operation result and the like, a timer, a counter, an input-output interface and so forth. The CPU, the memory and the input-output interface are connected to one another by means of a data bus. A program executed by the CPU implements various functions and operations of the display control unit 70, which will be described below.

The display control unit 70 communicates with the operating part 100 through a wire or wirelessly. After various switch signals from the operating part 100 are received, the display control unit 70 executes the conversion of an image displayed on the display part 40 (a task of generating a variety of operation menu images) or other tasks and, at the same time, sends signals corresponding to the various switch signals to additional control ECUs (e.g., a car navigation ECU, an audio system ECU, an air conditioner ECU and the like). Responsive to the signals from the display control unit 70, the additional control ECUs control vehicle-mounted equipment 80, e.g., a car navigation system, an audio system, an air conditioner and the like, in such a manner as to allow them to perform their functions in accordance with the various switch signals.

The display control unit 70 may also communicate with the display part 40 through a wire or wirelessly. In the present embodiment, the display part 40 is a head-up display (HUD).

Figure 2:
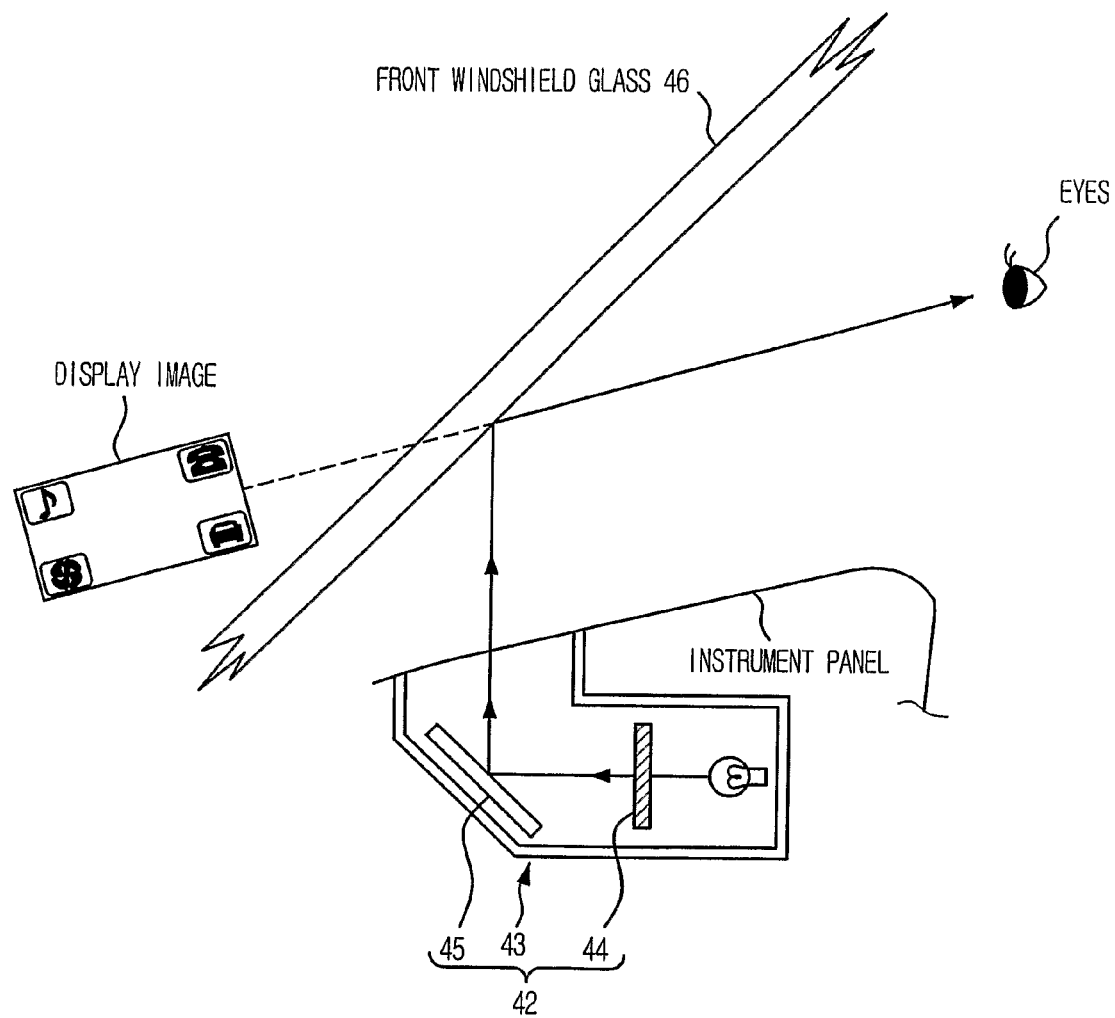
FIG. 2 is a sectional view illustrating one example of a head-up display.

FIG. 2 is a sectional view illustrating one example of the head-up display. The head-up display includes a head-up display unit 42. The head-up display unit 42 is mounted at an appropriate location inside an instrument panel within the passenger compartment, depending on the display position of an image, which is to be displayed on a front windshield 46. A display instrument 44 is received within a case 43 of the head-up display unit 42. The display instrument 44 projects a display light according to an image signal (a display image signal) fed from the display control unit 70. The display light projected from the display instrument 44 arrives at the front windshield 46 via a concave mirror 45. The display light is reflected by the front windshield 46 toward an observer (normally, the driver), whereby the reflected image corresponding to the image represented by the display instrument 44 is displayed in front of the driver. The head-up display may be used in a typical manner in order to display, e.g., an image captured by an infrared camera during night driving, as well as the operation menu image.

Furthermore, the display part 40 may be a display instrument of the type that can be directly viewed by a driver, e.g., a liquid crystal display, in which case the display part 40 is arranged at such a location as to allow the driver to see it with ease, preferably at a location that enables the driver to see it without overly changing his or her field of view when driving. For example, the display part 40 may be arranged at a top center area of the instrument panel. In this case, the display part 40 may be commonly used with a display for a navigation system. Moreover, the display part 40 may be a display panel arranged within a meter cluster panel.

Figure 3:
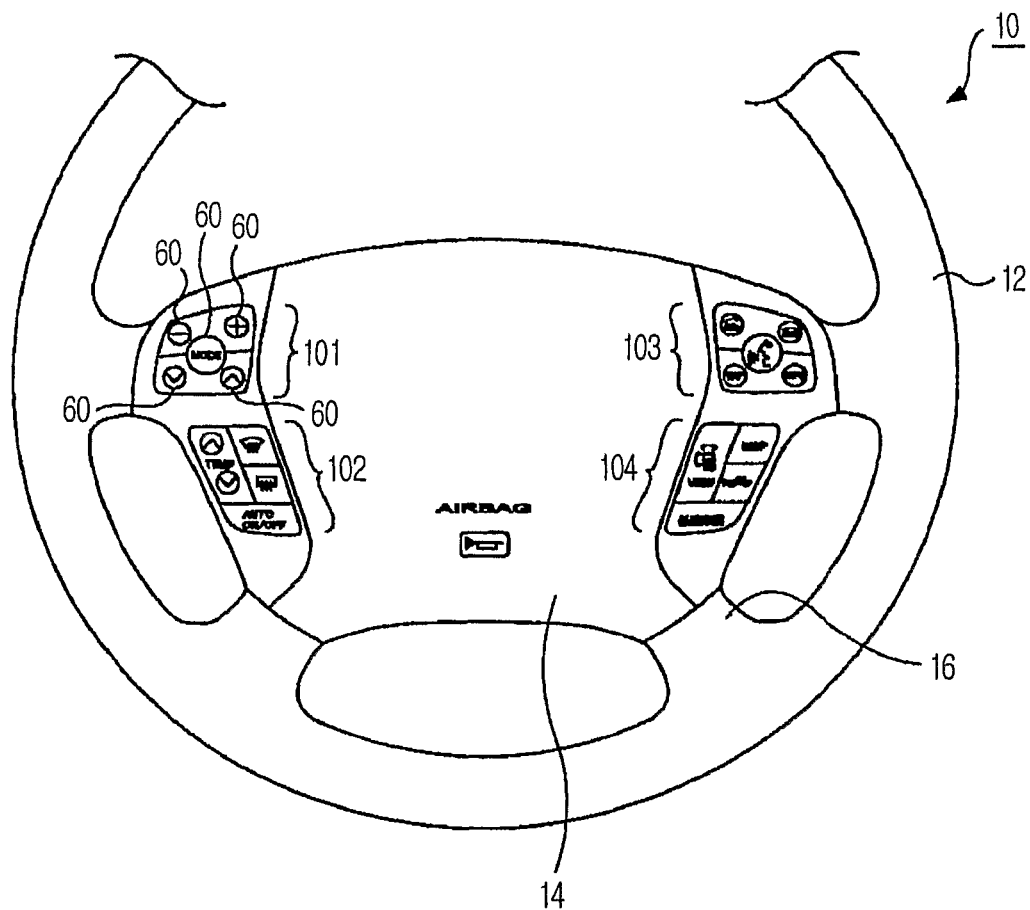
FIG. 3 is a top view showing one example of steering wheel switches arranged on a steering wheel.

FIG. 3 shows one embodiment of the operating part 100, together with one example of steering wheel switches 60 arranged on a steering wheel 10. The steering wheel 10 is on the same side as a driver's seat and is operatively connected to a steering shaft, not shown in the drawings. The operation of the steering wheel 10 steers the steered wheels of a motor vehicle. In the illustrated embodiment, the steering wheel 10 includes an annular handle portion 12 gripped and rotatingly operated by the driver, a center portion 14, and spokes 16 radially extending to interconnect the handle portion 12 and the center portion 14. The center portion 14 of the steering wheel 10 is designed to occupy a relatively large area, seeing that an airbag is attached thereto.

The steering wheel switches 60 are provided in the vicinity of base ends of the spokes 16, i.e., at outer periphery sides of the center portion 14. In the first embodiment, the steering wheel switches 60 are arranged in multiple numbers (six or more at the left and right sides, respectively) to provide an operating device with abundant functions. The steering wheel switches 60 may be made of resin or the like.

The steering wheel switches 60 shown in FIG. 3 are divided into four switch groups. In this example, the four switch groups consists of first and second left switch groups 101 and 102 intended for activation preferably with a driver's left hand gripping the steering wheel 10 and third and fourth right switch groups 103 and 104 intended for activation preferably with a driver's right hand gripping the steering wheel 10.

The first switch group 101 is densely arranged in the left upper region of the center portion 14 from the driver's view and may be used to operate, e.g., the audio system. The first switch group 101 shown in FIG. 3 is formed of five steering wheel switches 60 closely arranged with one another. Specifically, the first switch group 101 includes one steering wheel switch 60 surrounded by four steering wheel switches 60. The five steering wheel switches 60 may be, e.g., "seek" switches for searching desired playback media, switches for increasing or decreasing a playback output and a "mode" switch. On the surfaces of operating members (switch knobs) 64 (See FIG. 4) of the respective steering wheel switches 60, there are placed letters or designs that show functions of the respective steering wheel switches 60. The steering wheel switch 60 arranged at the center may be a fixed function switch such as a mode switch or may be formed of a multi-function switch capable of implementing a multiple number of functions.

The second switch group 102 is densely arranged in a left lower region of the center portion 14 from the driver's view and may be used to operate, e.g., the air-conditioning system. The second switch group 102 shown in FIG. 3 is formed of five steering wheel switches 60 closely arranged with one another. Specifically, the second switch group 102 includes four steering wheel switches 60 arranged in two left and right rows and one steering wheel switch 60 arranged below them and commensurate in breadth with the two rows. The five steering wheel switches 60 may be, e.g., switches for increasing or decreasing the passenger compartment temperature, a front defroster switch, a rear defogger switch and an automatic-operation ON/OFF switch. On the surfaces of operating members 64 (See FIG. 4) of the respective steering wheel switches 60, there are placed letters or designs that show functions of the respective steering wheel switches 60.

The third switch group 103 is densely arranged in a right upper region of the center portion 14 from a driver's view and may used to operate, e.g., a variety of voice systems with a wireless communication function. The third switch group 103 shown in FIG. 3 is formed of five steering wheel switches 60 closely arranged with one another. Specifically, just like the first switch group 101, the third switch group 103 includes one steering wheel switch 60 surrounded with four steering wheel switches 60. A layout of the respective steering wheel switches 60 in the third switch group 103 may be bilaterally symmetrical with respect to that of the respective steering wheel switches 60 in the first switch group 101. The five steering wheel switches 60 may be, e.g., switches for receiving or cutting off a call on a mobile phone (a car phone), a voice recognition switch adapted to be pressed when uttering a voice to be recognized, a "MAP" switch for restoring a current location display of a navigation screen, and an "INFO" switch for displaying various information. As set forth above, letters or designs that show functions of the respective steering wheel switches 60 are placed on the surfaces of operating members 64 (See FIG. 4) of the respective steering wheel switches 60.

The fourth switch group 104 is densely arranged in a right lower region of the center portion 14 from a driver's view and is used to operate, e.g., a vehicle information management system. The fourth switch group 104 shown in FIG. 3 is formed of five steering wheel switches 60 closely arranged with one another. Specifically, as with the second switch group 102, the fourth switch group 104 includes four steering wheel switches 60 arranged in two left and right rows and one steering wheel switch 60 arranged below them and commensurate in breadth with the two rows. A layout of the respective steering wheel switches 60 in the fourth switch group 104 may be bilaterally symmetrical with respect to that of the respective steering wheel switches 60 in the second switch group 102. The five steering wheel switches 60 may be, e.g., "VIEW" switches for converting a displayed image to a surrounding area monitoring image indicative of the monitoring result captured by, e.g., a clearance sonar or a surrounding area monitoring camera, a "DISP" switch for changing the representation of a meter or a display, a switch for changing the inter-vehicle distance in a laser cruise control, and a switch for making conversion to a low speed tracking mode in the laser cruise control. As set forth before, letters or designs that show functions of the respective steering wheel switches 60 are placed on the surfaces of operating members 64 (See FIG. 4) of the respective steering wheel switches 60.

Figure 4:
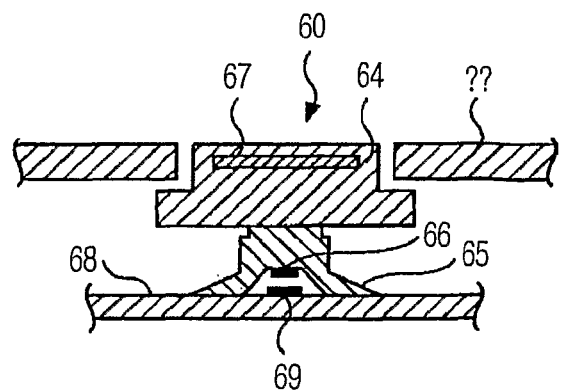
FIG. 4 is a sectional view showing one example of a cross-sectional structure of the steering wheel switches.

FIG. 4 is a sectional view showing one example of a cross-sectional structure of one of the steering wheel switches 60. In the following description, a configuration of one of the steering wheel switches 60 will be representatively described with reference to FIG. 4. The rest of the steering wheel switches 60 may have the same configuration as the one described below.

In the illustrated example, the steering wheel switch 60 includes an operating member 64 accessible by the driver's thumb. The operating member 64 is supported at its inner side by a leg portion (a rubber dome) 65 made of an elastic material and formed upright on a substrate 68. A closed circuit contact 66 is provided in the vicinity of a fixing root of the leg portion 65. When the driver presses down on the operating member 64, the leg portion 65 is elastically deformed so that the contact 66 contacts the open circuit contact 69. In response, activation of the steering wheel switch 60 is electrically detected. Alternatively, the steering wheel switch 60 may employ a variety of springs to create a feeling of operation. Moreover, the steering wheel switch 60 is not limited to the electric contact type switch but may be of other types of switches such as a capacitance variation sensing switch and the like. A switch signal generated by the steering wheel switch 60 is fed to the display control unit 70 (see FIG. 1) via, e.g., a FPC (flexible printed circuit). The display control unit 70 controls various kinds of vehicle-mounted equipment 80 through other ECUs to perform the functions according to a variety of switch signals.

A touch sensor 67 is embedded in the operating member 64. The touch sensor 67 detects contact or access (hereinafter collectively referred to as "contact") of a driver's thumb. In the illustrated example, the touch sensor 67 is embedded just below the top surface of the operating member 64 of the steering wheel switch 60. The touch sensor 67 may be of the type that senses the contact of the driver's finger (generally, the driver's thumb) with the steering wheel switch 60 through detection of a contact current or capacitance or by measuring a distance with an infrared light. Furthermore, the steering wheel switch 60 and the touch sensor 67 may be formed into an integral switch of the type sensing two operation steps (a contact step and an activating step) in two stages based on the capacitance and the magnitude of pressure sensed. A contact detection signal from the touch sensor 67 is fed to the display control unit 70 (see FIG. 1) via, e.g., the FPC. As will be described hereinafter, pursuant to the contact detection signal, the display control unit 70 properly controls representation of functions displayed on the display part 40.

Figure 5:
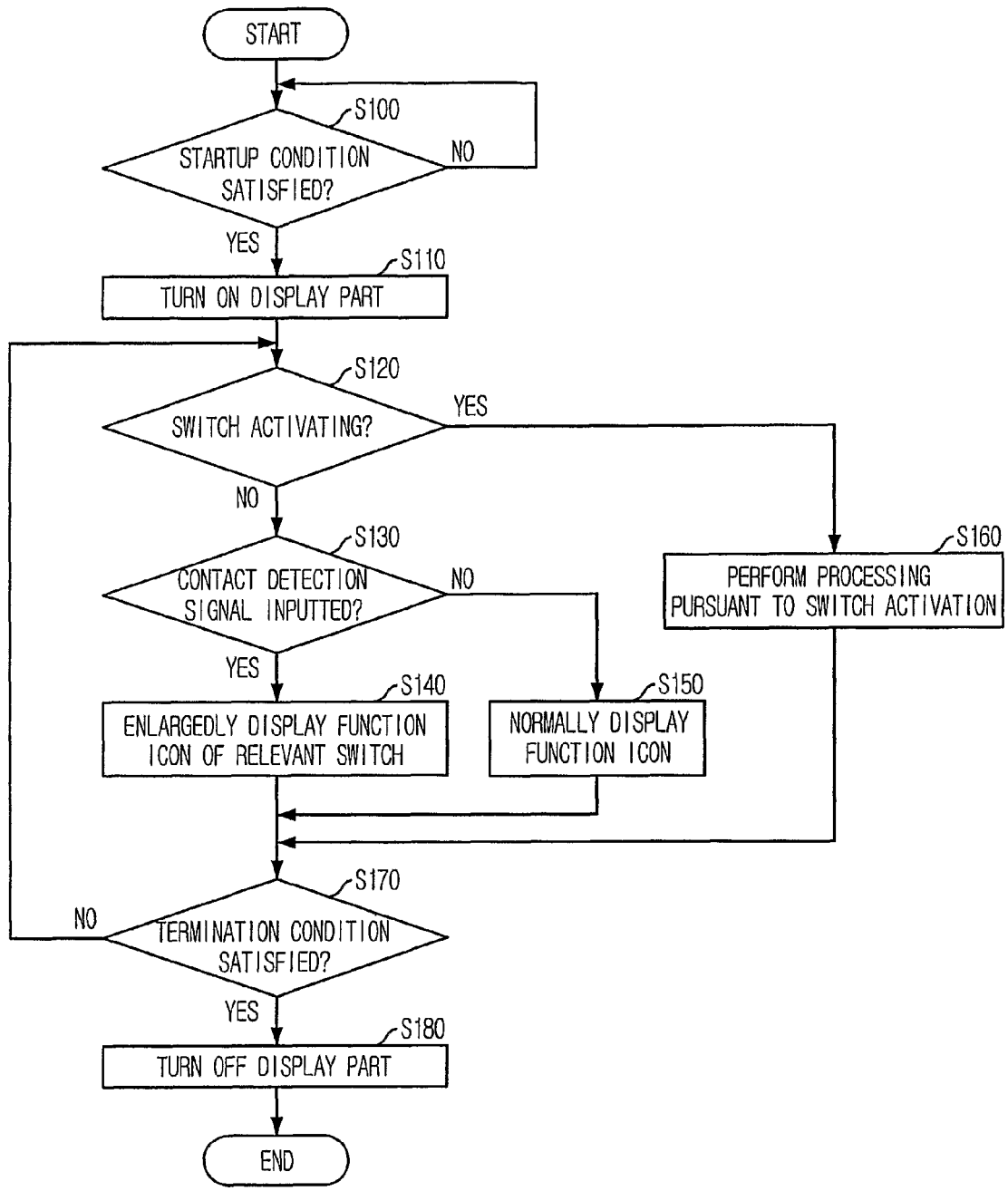
FIG. 5 is a flowchart illustrating a major processing performed by a display control unit before activating the steering wheel switches.

FIG. 5 is a flowchart illustrating the major processing performed by the display control unit 70, in relation to the position of the driver's thumb with respect to the steering wheel switch 60.

In step S100, it is first determined whether a predetermined startup condition is satisfied. The startup condition is regarded as satisfied if, for instance, the contact of the driver's thumb with any of the steering wheel switches 60 is sensed. When the startup condition is satisfied, the display part 40 is turned "ON" (step S110). In the illustrated embodiment, a given display light is projected from the display instrument 44 and then reflected by the front windshield 46 toward the driver, whereby the image (operation menu image) represented by the display instrument 44 is displayed in front of the driver. Once the startup condition is satisfied, the display part 40 remains "ON" until a predetermined termination condition is satisfied (until affirmative determination is rendered in step S170). The termination condition may be satisfied if, for instance, none of the steering wheel switches 60 is touched or activated for a predetermined period of time. When the termination condition is satisfied, the display instrument 44 stops projecting the display light to thereby remove the display image (reflection image) to turn the display part 40 "OFF".

Steps S120 through S160 are continuously performed while the display part 40 "ON".

In step S120, it is determined whether the steering wheel switches 60 are being activated. The determination is made based on the presence or absence of a switch signal input from the steering wheel switches 60. In case the steering wheel switches 60 are being activated, the display control unit 70 controls a variety of vehicle-mounted equipment 80 in response to the switch signal that is input and, if needed, converts the image displayed on the display part 40. Examples of the conversion of the image displayed on the display part 40 include switchover (transition) from an operation menu image to, e.g., a detailed operation guide image and switchover from the operation menu image to a status display image representing the status of a vehicle-mounted equipment 80 currently operated. If the switch activation is completed, the display image reverts to the operation menu image of a normal display condition (see FIG. 6).

Steps S130 through S150 are continuously performed while the steering wheel switches 60 are not being activated.

In step S130, based on a contact detection signal input from time to time, the display control unit 70 determines whether the contact of a thumb with any of the steering wheel switches 60 is sensed. That is, it is determined whether the contact detection signal has been input. If no contact detection signal is input (if the determination in step S130 is negative), the operation menu image is displayed in a normal display condition (step S150). If the contact detection signal is input (if the determination in step S130 is affirmative), the operation menu image highlights a function icon associated with the switch group to which the steering wheel switch 60 touched by the thumb belongs and also highlights a function-identifying subdivision associated with the steering wheel switch 60 touched by the thumb (step S140), which step will be described in more detail later.

Figure 6:
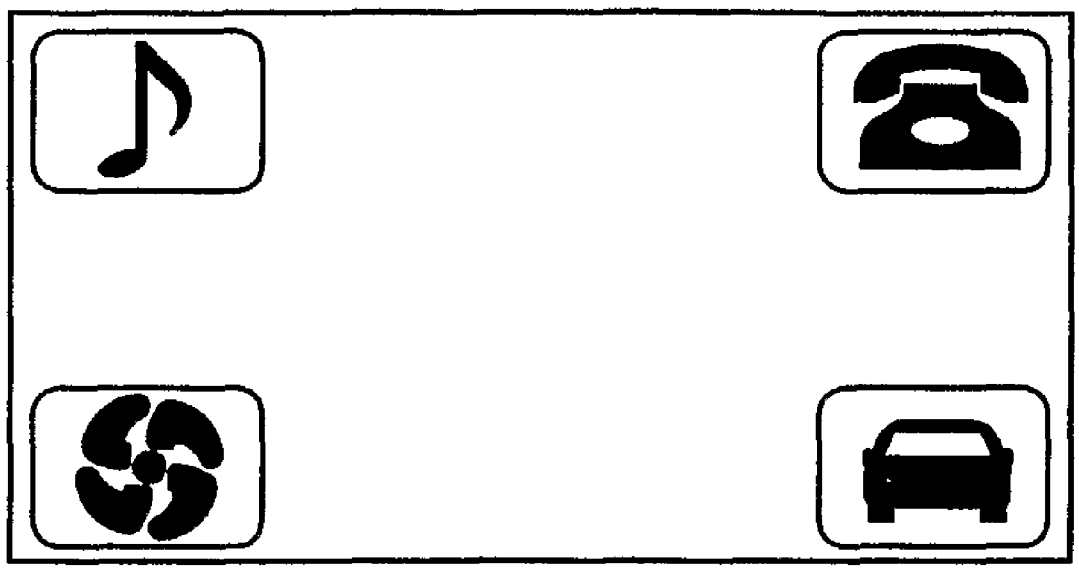
FIG. 6 is a view showing an operation menu image in a normal display condition.

Referring now to FIGS. 6 and 7, a normal display condition of the operation menu image performed in step S150 and a highlighted display condition of the operation menu image executed in step 140 will be described.

FIG. 6 is a view showing the operation menu image in the normal display condition. The operation menu image is an image for assisting a driver in operating the operating part 100. The operation menu image informs the driver of various functions performed by activation of the steering wheel switches 60 of the operating part 100 and also advises the driver of the positions of the steering wheel switches 60 which need to be activated to perform the various functions. The operation menu image is a basic image from which the display image conversion is conducted in the display part 40 and a gate image through which other display images such as a detailed operation guide image and the like are accessible.

In the normal display condition illustrated in FIG. 6, function icons representing the functions of the respective steering wheel switches 60 are displayed in the substantially same layout as that of the steering wheel switches 60 shown in FIG. 3.

With the above-described configuration that employs the steering wheel switches 60 in multiple numbers, however, the function icons in the operation menu image would be arranged too densely as in the layout of the steering wheel switches 60 and therefore would become difficult to discriminate, in a hypothetical case that an attempt is made to represent all of the individual functions of the steering wheel switches 60 on a switch-by-switch basis.

Taking this into account, in the present embodiment, if none of the steering wheel switches 60 is touched by the driver's thumb, generic function icons, each of which shows one representative function of the steering wheel switches 60 belonging to the same switch group, are displayed in the normal display condition of the operation menu image, as illustrated in FIG. 6. Specifically, in the normal display condition shown in FIG. 6, a generic function icon imitating a "music note" representative of an audio function is used to show the functions of the respective steering wheel switches 60 belonging to the first switch group 101. Similarly, a generic function icon imitating a "blower" representative of an air-conditioning function is used to show the functions of the respective steering wheel switches 60 belonging to the second switch group 102. A generic function icon imitating a "telephone" representative of a voice function is used to show the functions of the respective steering wheel switches 60 belonging to the third switch group 103. A generic function icon imitating a "motor vehicle" representative of a vehicle information management function is used to show the functions of the respective steering wheel switches 60 belonging to the fourth switch group 104.

As described above, in accordance with the present embodiment, the number of functions executable by activation of switches on the steering wheel 10 can be increased by arranging the steering wheel switches 60 on the steering wheel 10 in multiple numbers, while preventing a harmful influence otherwise exercised by such a switch arrangement (the difficulty in discriminating icons of individual functions otherwise densely displayed in an one-to-one relationship with the multiple number of steering wheel switches 60). Use of the generic function icons makes it possible to display the switch functions with a relatively large size and in an easy-to-discriminate manner. Moreover, because the generic function icons are arranged in the substantially same pattern as the respective switch groups 101-104 (hence, the respective steering wheel switches 60 belonging to each of the switch groups), the driver can comprehend the rough positional relationship of the respective switch groups 101-104 by relying upon the positional relationship of the generic function icons.

Figure 7A:
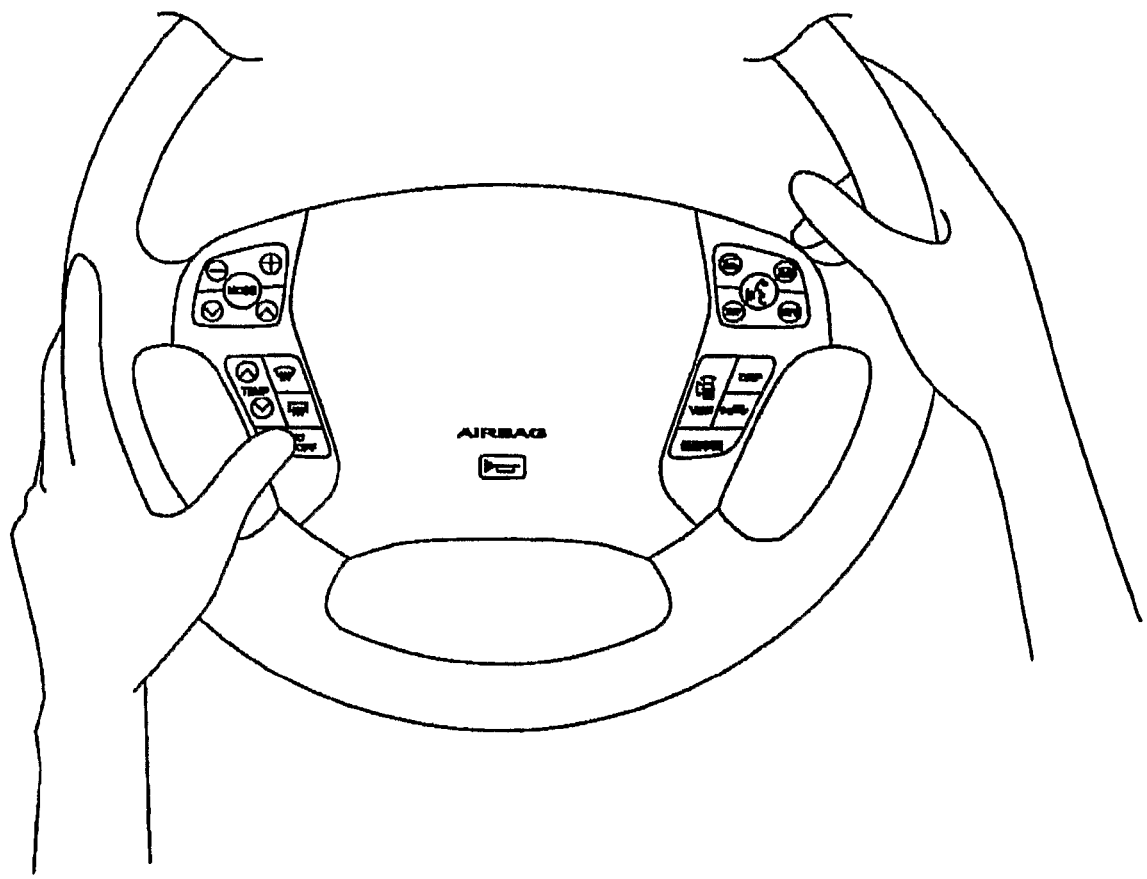
FIG. 7A is a view illustrating one exemplary situation where a driver is touching one of the steering wheel switches.
Figure 7B:
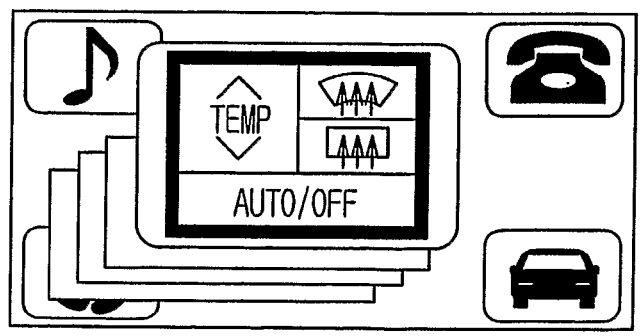
FIG. 7B is a view showing an operation menu image displayed at that time.

FIG. 7A is a view illustrating one exemplary situation that a driver is touching one of the steering wheel switches 60, and FIG. 7B is a view showing an operation menu image displayed at that time In the example illustrated in FIG. 7A, the driver's thumb is touching one of the steering wheel switches 60 of the second switch group 102 (the automatic-operation ON/OFF switch in the illustrated example). Thus, an enlarged function icon for the second switch group 102 to which the touched steering wheel switch 60 belongs is displayed, as shown in FIG. 7B. At this time, the function icon for the second switch group 102 is enlarged as it is moved toward the center of a screen. Concurrently, the generic function icon is changed to an individual function icon separately showing the functions of the steering wheel switches 60 belonging to the second switch group 102. In the illustrated example, the individual function icon includes function-identifying subdivisions arranged in the substantially same layout as that of the five steering wheel switches 60 of the second switch group 102 and adapted to separately represent five functions, i.e., temperature increase and decrease functions, a front defroster function, a rear defogger function and an automatic-operation ON/OFF function. As shown in FIGS. 3 and 7B, the individual function-identifying subdivisions may have letters or designs corresponding to those placed on the surfaces of the operating members 64 of the respective steering wheel switches 60.

When enlarged as shown in FIG. 7B, the individual function icon may completely hide the generic function icons not enlarged (namely, the individual function icon may be enlarged over the whole screen). However, it is preferred that the individual function icon is enlarged within a range in which the generic function icons not enlarged remain visible. This is because the driver may sometimes be in a stage of searching for a desired switch group and may wish to learn the position of the desired switch group relative to the currently touched switch group, although it is usually the case that the driver is primarily concerned about the functions and the positions of the respective steering wheel switches 60 of the switch group currently touched. In the illustrated embodiment, because the generic function icon for the air-conditioning function is enlarged to just partially hide the generic function icon for the audio function, it is still possible for the driver to grasp the position of the generic function icon for the audio function. Inasmuch as the individual function icon for the air-conditioning function is enlarged in such a fashion as to gradually zoom in from the original generic function icon, the driver can comprehend that the switch group relating to the individual function icon is placed in a left lower position, even when the individual function icon is displayed. Thus, it is possible for the driver to easily grasp the current thumb position with respect to another desired switch group. For example, in case the driver wishes to operate the audio function, it can be easily understood that the thumb needs to be moved up from the current thumb position on the steering wheel.

As described above, in accordance with the present embodiment, if the driver's thumb touches a region in which a plurality of steering wheel switches 60 associated with the air-conditioning function are grouped together, the enlarged icons corresponding to the individual functions of the steering wheel switches 60 are displayed in a highlighted manner. Accordingly, the driver can easily comprehend, without having to directly look at the steering wheel switches 60 on the steering wheel 10, that the thumb is currently placed over an air-conditioning switch region of the operating part 100 in condition for operation of the air-conditioning function. In addition, the driver can learn the individual functions of the respective steering wheel switches 60 with ease by seeing the individual function icon. With the present embodiment noted above, the generic function icon is properly converted to the individual function icon in the configuration of the steering wheel 10 having a large number of steering wheel switches 60. This makes it possible to prevent the individual functions for the large number of steering wheel switches 60 from being densely displayed in a crowded and hard-to-discriminate manner, while allowing the driver to see the individual functions of the respective steering wheel switches 60, if needed.

Furthermore, in the example illustrated in FIGS. 7A and 7B, the driver's thumb is touching the automatic-operation ON/OFF switch of the second switch group 102 and, therefore, the function-identifying subdivision associated with the automatic-operation ON/OFF switch is highlighted in the individual function icon for the second switch group 102. The highlighted representation may be performed by, e.g., differentiating the function-identifying subdivision from other subdivisions in brightness, contrast, color or the like. Thus, in accordance with the present embodiment, the driver can learn that his or her thumb is placed on the automatic-operation ON/OFF switch in the air-conditioning switch region, by just seeing the highlighted function-identifying subdivision without the need to directly look at the steering wheel 10. Moreover, in the present embodiment, as set forth earlier, the individual function icon has the function-identifying subdivisions arranged in a layout corresponding to that of the steering wheel switches 60 of the second switch group 102 and adapted to represent the individual functions of the respective steering wheel switches 60. Thus, in the present embodiment, the driver can learn the positional relationship between the highlighted function-identifying subdivision and the remaining non-highlighted function-identifying subdivisions of the individual function icon, by just seeing the subdivision layout in the individual function icon without the need to directly look at the steering wheel 10. This enables the driver to comprehend the positions of other steering wheel switches 60 in the switch group to which the steering wheel switch 60 currently touched by the driver's thumb belongs. Accordingly, the driver can operate the operating part 100 while looking at the display part 40. In other words, it becomes possible to perform what is called a "blind-touch operation" that eliminates the need for the driver to look at the steering wheel 10.

Although the foregoing description is centered on an instance that one of the steering wheel switches 60 belonging to the second switch group 102 is touched by a driver's thumb, this also holds true for other switch groups 101, 103 and 104.

Figure 8:
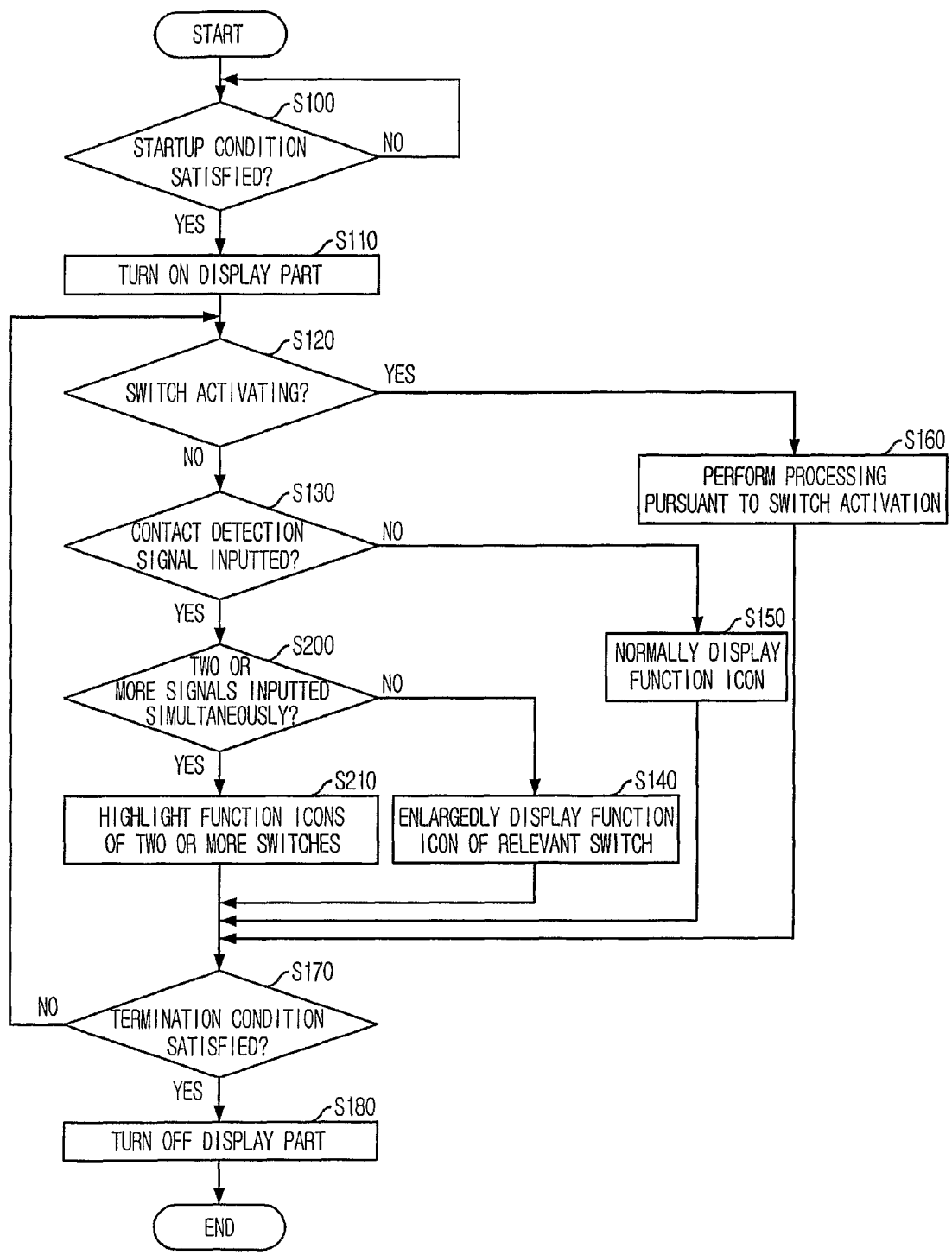
FIG. 8 is a flowchart illustrating another embodiment (a first modified embodiment) of the major processing performed by the display control unit.

FIG. 8 is a flowchart illustrating another embodiment of the major processing performed by the display control unit 70. The processing illustrated in FIG. 8 differs from the processing shown in FIG. 5 in that two or more steering wheel switches 60 are simultaneously touched by a driver's thumb. The same processing steps as those shown in FIG. 5 will be designated by like reference numerals, with no description given in that regard.

In step S200, it is determined whether contact detection signals for two or more steering wheel switches 60 belonging to different switch groups are being simultaneously input. If it is determined that two or more contact detection signals are not input simultaneously, i.e., either if only one steering wheel switch 60 is touched by the driver's thumb or if the driver's thumb touches two or more steering wheel switches 60 belonging to the same switch group, step S140 is performed. In this case, the display part 40 displays an individual function icon in the same manner as described above and also displays individual functions of the respective steering wheel switches 60 of the switch group to which the steering wheel switch 60 touched by the driver's thumb belongs. On the other hand, the process proceeds to step S210 if two or more contact detection signals are input simultaneously.

In step S210, function icons for the two or more steering wheel switches 60 touched by the driver's thumb (two or more generic function icons) are displayed in a highlighted condition. In other words, the function icons for the steering wheel switches 60 touched by the driver's thumb are kept in a normally displayed condition without being changed from generic function icons to individual function icons but, instead, the relevant generic function icons are highlighted so as to be distinguished from the normally displayed ones. The highlighted representation may be performed by, e.g., differentiating the target generic function icons from other normally displayed generic function icons in brightness, contrast, color or the like.

Figure 9A:
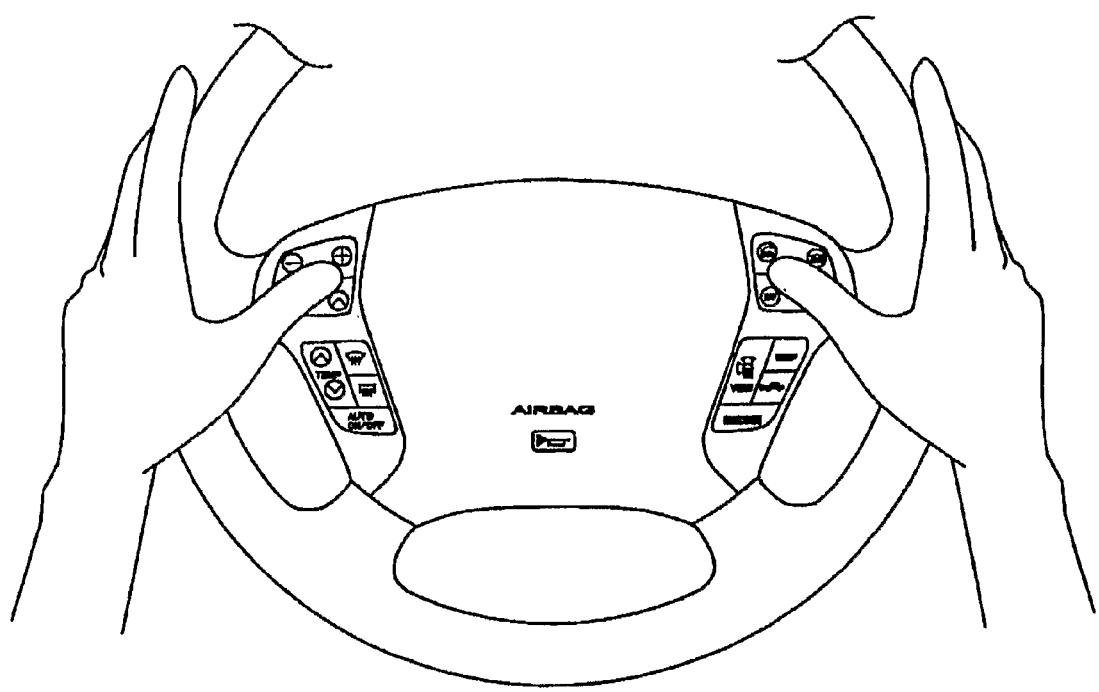
FIG. 9A is a view illustrating one exemplary situation where a driver is simultaneously touching two of the steering wheel switches.
Figure 9B:
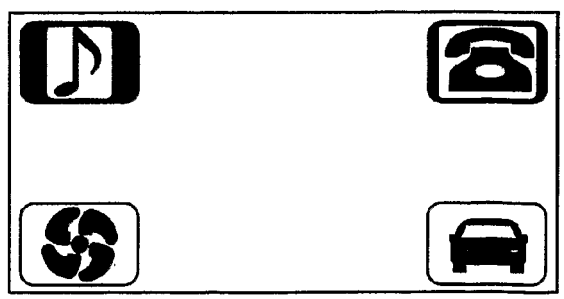
FIG. 9B is a view showing an operation menu image displayed at that time.

FIG. 9A is a view illustrating one exemplary situation where the driver is simultaneously touching two of the steering wheel switches 60, and FIG. 9B is a view showing an operation menu image displayed at that time. In the example illustrated in FIG. 9A, the driver is simultaneously touching (but not activating) the steering wheel switch 60 belonging to the first switch group 101 and the steering wheel switch 60 belonging to the third switch group 103. Therefore, as illustrated in FIG. 9B, the generic function icons representing the audio function and the voice function are highlighted in such a fashion as to be distinguished from the remaining two generic function icons. In the illustrated example, the relevant generic function icons are highlighted at their opposite sides or at their rims.

In the meantime, the steering wheel switches 60 are arranged in such positions as to ensure that, while gripping the steering wheel 10, the driver can naturally activate the steering wheel switches 60 through a smooth thumb motion. Normally, the driver activates the switches with the steering wheel 10 gripped with his or her hands, for the reason of which the driver's thumbs are apt to touch undesired steering wheel switches 60. For instance, despite the driver's intention to activate the steering wheel switches 60 of the left-side first switch group 101 with his or her left thumb, it may be sometimes the case that the right thumb unintentionally touches the right-side third switch group 103 at the same moment. On this occasion, if the right thumb is given a force together with the operation of the steering wheel 10 for example, there is a possibility that the functions of the steering wheel switches 60 belonging to the third switch group 103 are inadvertently performed against the driver's intention.

In contrast, according to the present embodiment, if the steering wheel switches 60 belonging to two or more switch groups are simultaneously touched by the driver's thumbs, the generic function icons for the two or more switch groups to which the steering wheel switches 60 touched by the driver's thumbs belong are just highlighted without displaying the individual function icon for one of the switch groups. Thus, without having to directly look at the steering wheel 10, the driver can comprehend that his or her thumbs are currently touching two or more steering wheel switches 60 belonging to two or more switch groups, by perceiving occurrence of such an event that, despite the driver's touching the steering wheel switches 60, the individual function icon does not appear or the generic function icons for the two or more switch groups are displayed in an highlighted condition. This enables the driver to change the thumb position or take other measures, thereby preventing unwanted switch activation from happening.

In the present embodiment, if it is determined that two or more steering wheel switches 60 belonging to the same switch group are simultaneously touched by the driver's thumb, the display control unit 70 may change the function icon of the switch group associated with the two or more steering wheel switches 60 from a generic function icon to an individual function icon. At this time, the display control unit 70 may highlight the function-identifying subdivisions for the two or more steering wheel switches 60 in such a fashion as distinguished from the manner of highlighting the function-identifying subdivision when one of the steering wheel switches 60 is touched by the driver's thumb. Thus, without having to directly look at the steering wheel 10, the driver can comprehend that his or her thumb is currently touching two or more steering wheel switches 60 in the same switch group, by perceiving occurrence of such an event that the function-identifying subdivisions for the two or more steering wheel switches 60 are highlighted in the individual function icon. This enables the driver to change the thumb position or take other measures, thereby preventing unwanted switch activation from happening.

Figure 10:
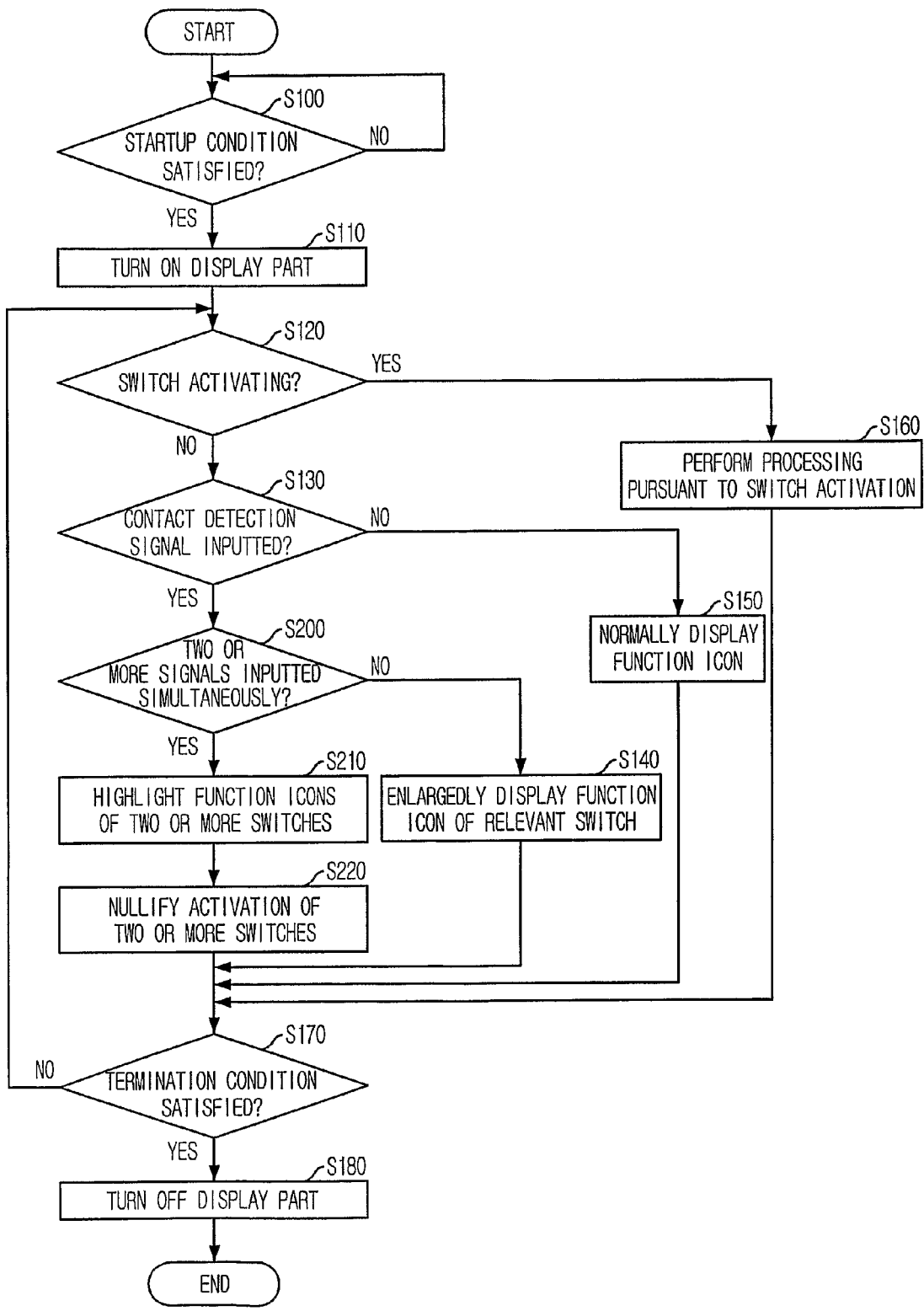
FIG. 10 is a flowchart illustrating a further embodiment (a second modified embodiment) of the major processing performed by the display control unit.

FIG. 10 is a flowchart illustrating a further embodiment of the major processing performed by the display control unit 70. The processing illustrated in FIG. 10 differs from the processing shown in FIG. 8 in that, if the driver's thumb is simultaneously touching two or more steering wheel switches 60, the driver's activation of the switches is nullified. The same processing steps as those shown in FIG. 8 will be designated by like reference numerals, with no description given in that regard.

In step S220, the display control unit 70 nullifies the driver's activation for the two or more steering wheel switches 60 touched by his or her thumb. Thus, even if one of the two or more steering wheel switches 60 is activated by the driver at a later time and hence the determination made in step S120 becomes affirmative, the operation (function) corresponding to the steering wheel switch 60 thus activated is not performed in step S140. Such a nullification task may be performed by, e.g., not executing the processing for the switch signals (generated at the time of switch activation) from the two or more steering wheel switches 60. The nullification may end when the driver's thumb is no longer in contact with the two or more steering wheel switches 60.

As set forth above, the driver performs switch activation with the steering wheel 10 gripped with his or her hands, for the reason of which the driver's thumbs are apt to touch undesired steering wheel switches 60. On this occasion, if the right thumb is given a force together with the steering operation of the steering wheel 10 for example, there is a possibility that the undesired steering wheel switches 60 are activated to thereby perform the functions thereof against the driver's intention.

In contrast, according to the present embodiment, if the driver's thumbs simultaneously touch the steering wheel switches 60 belonging to two or more switch groups, the activation for the steering wheel switches 60 is nullified. Thus, even when the driver has erroneously pressed down, together with the steering operation for the steering wheel 10, the undesired one of the two or more steering wheel switches 60 currently touched by the driver's thumbs, the operation associated therewith is not performed at all, which makes it possible to prevent unwanted driver's switch activation from happening.

From the same view point as described above, the display control unit 70 of the present embodiment may allow activation of the respective steering wheel switches 60 whose individual functions are represented by an individual function icon, only while the individual function icon is displayed. In this case, activation of a specific steering wheel switch 60 is permitted only when the individual function icon has appeared. Thus, if the individual function icon is not yet displayed, even if the driver has erroneously pressed down, together with the steering operation for the steering wheel 10, the undesired one of the two or more steering wheel switches 60 currently touched by the driver's thumbs, the operation associated therewith is not performed at all, which makes it possible to prevent unwanted driver's switch activation from happening.

In the present embodiment, if the driver's thumbs simultaneously touch the steering wheel switches 60 belonging to the same switch group, the display control unit 70 may nullify the activation for the two or more steering wheel switches 60. Thus, without having to directly look at the steering wheel 10, the driver can comprehend that his or her thumb is currently touching two or more steering wheel switches 60 in the same switch group, by perceiving occurrence of an event that the function-identifying subdivisions for the two or more steering wheel switches 60 are highlighted in the individual function icon. Accordingly, even if the driver has erroneously pressed down the undesired one of the two or more steering wheel switches 60 currently touched by the driver's thumbs, the operation associated therewith is not performed at all, which makes it possible to prevent unwanted driver's switch activation from happening.

Although, in the first embodiment described above, the multiple number of steering wheel switches 60 are divided into four groups on a function basis with a view to make a multiple number of functions executable and to improve the operability thereof, it may be possible to arrange the steering wheel switches 60 only in two left and right groups without dividing them into the groups having the same number of steering wheel switches 60. Furthermore, unlike the first embodiment in which the steering wheel switches 60 are divided into four groups, the steering wheel switches 60 may be divided into three groups or more than four groups.

Figure 11:
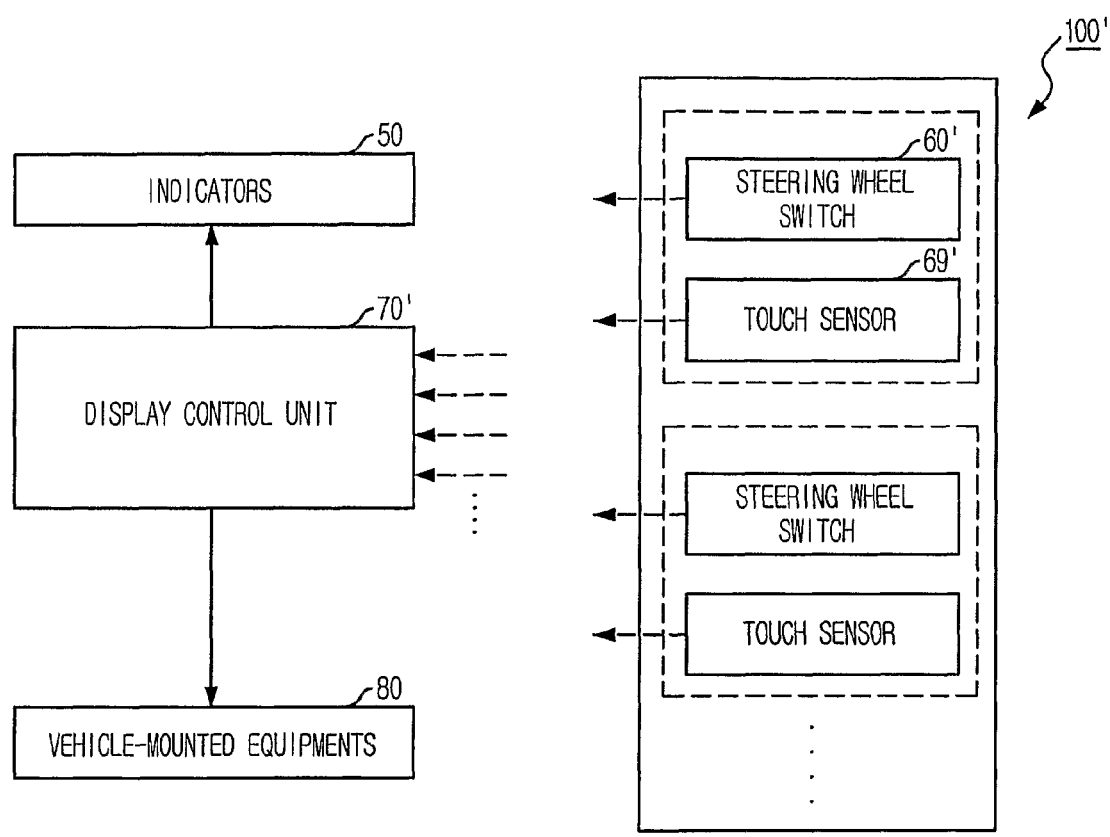
FIG. 11 is a function-based block diagram showing one example of a major configuration of an operating device in accordance with a second embodiment of the present invention.
Figure 15:
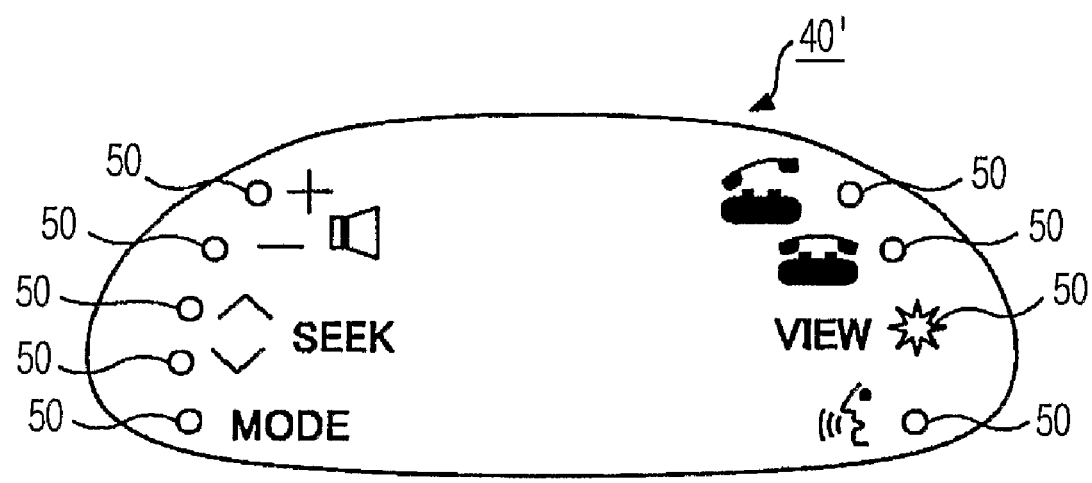
FIG. 15 is a view showing one example of a display part of the operating device in accordance with the second embodiment of the present invention.

FIG. 11 is a function-based block diagram showing one example of a major configuration of an operating device in accordance with a second embodiment of the present invention. The same components as those of the first embodiment will be designated by like reference numerals, with no description given in that regard. As shown in FIGS. 11 and 15, an operating device of the present embodiment includes an operating part 100', a display part 40' for assisting a driver in operating the operating part 100', a display control unit 70', and a plurality of indicators 50 for highlighting function icons of the display part 40'.

The display control unit 70' is mainly formed of a microcomputer. Various functions and operations of the display control unit 70', which will be set forth below, are performed by a program executed by a CPU.

The display control unit 70' is adapted to perform wire communication or wireless communication with the operating part 100'. Upon receipt of various switch signals from the operating part 100', the display control unit 70' executes a task of sending signals corresponding to the various switch signals to additional control ECUs (e.g., a car navigation ECU, an audio system ECU, an air conditioner ECU and the like). Responsive to the signals from the display control unit 70', the additional control ECUs control vehicle-mounted equipment 80, e.g., a car navigation system, an audio system, an air conditioner and the like, in such a manner as to allow them to perform their functions in accordance with the various switch signals.

Figure 12:
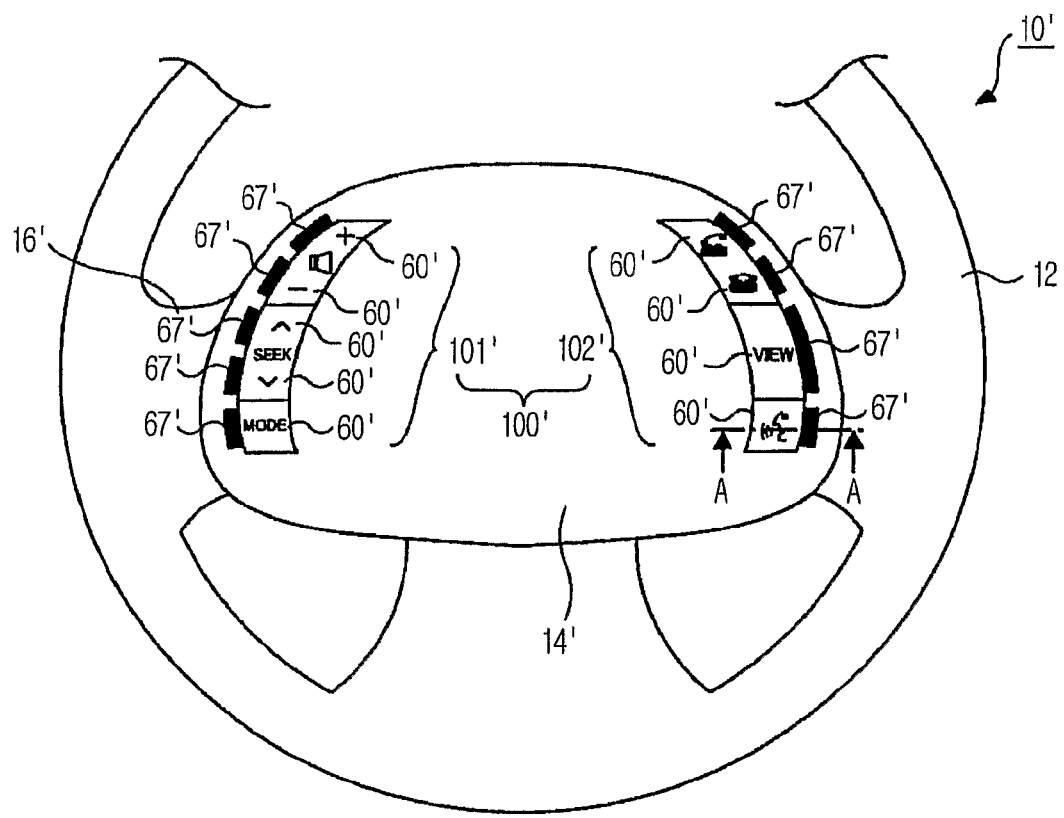
FIG. 12 is a top view showing one example of steering wheel switches arranged on a steering wheel.

FIG. 12 shows one example of the operating part 100' in accordance with the present embodiment and one example of steering wheel switches 60' provided on a steering wheel 10'. The steering wheel switches 60' are symmetrically arranged at the left and right sides of a center portion 14' of the steering wheel 10'. In the second embodiment, the steering wheel switches 60' are arranged on the steering wheel 10' in a relatively reduced number (five or less at the left and right sides, respectively), thus forming an operating device with a simplified function. That is, the steering wheel switches 60' of the second embodiment are far smaller in number than the steering wheel switches 60 of the first embodiment described above and are carefully selected from the steering wheel switches that perform functions used in various applications at an increased frequency or with a higher degree of importance.

The steering wheel switches 60' illustrated in FIG. 12 are divided into two groups. In this example, the steering wheel switches 60' are divided into a left switch group 101' intended for activation preferably with a driver's left hand gripping the steering wheel 10' and a right switch group 102' intended for activation preferably with a driver's right hand gripping the steering wheel 10'.

The left switch group 101' is arranged in a row on the left side of the steering wheel 10' from the driver's view and is used to operate, e.g., an audio system. In the illustrated example, the left switch group 101' includes five steering wheel switches 60' arranged along the periphery of the steering wheel 10' (with a generally equal distance from a handle portion 12). The five steering wheel switches 60' may be, e.g., switches for increasing or decreasing a sound volume, "seek" switches for searching desired playback media, and a "mode" switch. On the surfaces of operating members (switch knobs) 64' of the respective steering wheel switches 60', there are placed letters or designs that show the functions of the respective steering wheel switches 60'.

The right switch group 102' is arranged in a row on the right side of the steering wheel 10' from a driver's view and is used to operate, e.g., a voice function system. In the illustrated example, the right switch group 102' includes four steering wheel switches 60' which may be, e.g., switches for taking or ending a call on a mobile phone, a "VIEW" switch for converting a displayed image to a surrounding area monitoring image and a voice recognition switch adapted to be pressed when uttering a voice to be recognized. As set forth above, letters or designs that show functions of the respective steering wheel switches 60' are placed on the surfaces of the operating members 64' (See FIG. 13) of the respective steering wheel switches 60'.

Figure 13:
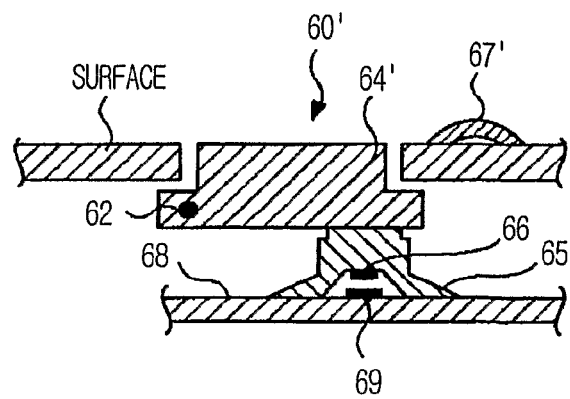
FIG. 13 is a sectional view taken along line A-A in FIG. 12, showing one example of a cross-sectional structure of the steering wheel switches.

FIG. 13 is a sectional view taken along line A-A in FIG. 12. In the following description, a configuration of one of the steering wheel switches 60' will be representatively described with reference to FIG. 13. The rest of the steering wheel switches 60' may have the same configuration as the one described below.

In the illustrated example, the steering wheel switch 60' includes an operating member 64' rotatable about a pin 62. The operating member 64' is supported at its inner side by a leg portion 65 made of an elastic material and formed upright on a substrate 68'. A contact 66 is provided in the vicinity of a fixing root of the leg portion 65. When the operating member 64' is pressed by a driver, the leg portion 65 is elastically deformed so that the contact 66 contacts an electrode 69 on the substrate 68'. In response, activation of the steering wheel switch 60' is electrically detected. Alternatively, the steering wheel switch 60' may employ a variety of springs to create a feeling of operation. Moreover, the steering wheel switch 60' is not limited to the electric contact type switch but may be of other types of switches such as a capacitance variation sensing switch and the like. A switch signal generated by the steering wheel switch 60' is fed to the display control unit 70' (see FIG. 11) via, e.g., a FPC. The display control unit 70' controls various kinds of vehicle-mounted equipment 80 through other ECUs to perform the functions according to a variety of switch signals.

A touch sensor 67' is provided adjacent to the operating member 64'. The touch sensor 67' serves to detect contact or access (hereinafter collectively referred to as "contact") of the driver's thumb. In the illustrated example, the touch sensor 67' is a contact sensing electrode. As illustrated in FIG. 12, the touch sensor 67' is arranged in the vicinity of the operating member 64' at the outer periphery side of the steering wheel 10' with respect to the operating member 64'. In other words, the touch sensor 67' adjoins the outer side of the operating member 64' and is attached to or embedded in a surface layer of the steering wheel 10'. A contact detection signal from the touch sensor 67' is fed to the display control unit 70' (see FIG. 11) via, e.g., the FPC. As will be described later, pursuant to the contact detection signal, the display control unit 70' properly controls a lighting condition of the indicators 50 arranged on the display part 40'.

Figure 14A:
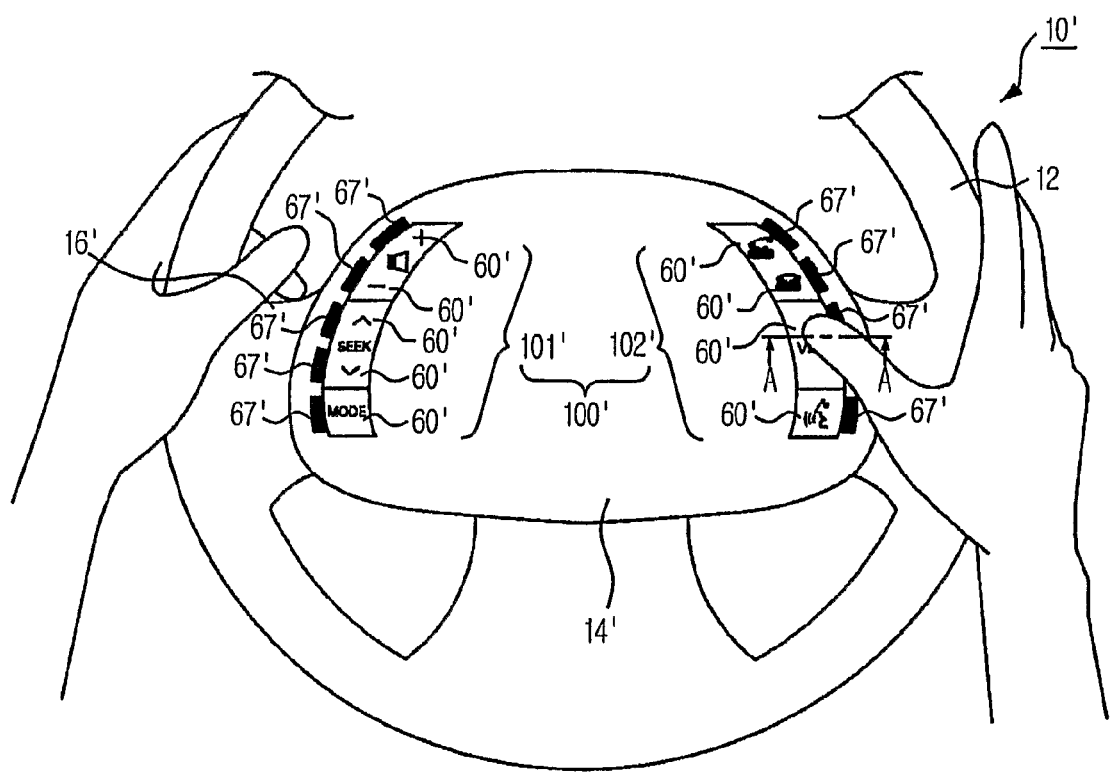
FIG. 14A is a view showing a condition where a driver activates the steering wheel switches of the steering wheel in a regular good posture.
Figure 14B:
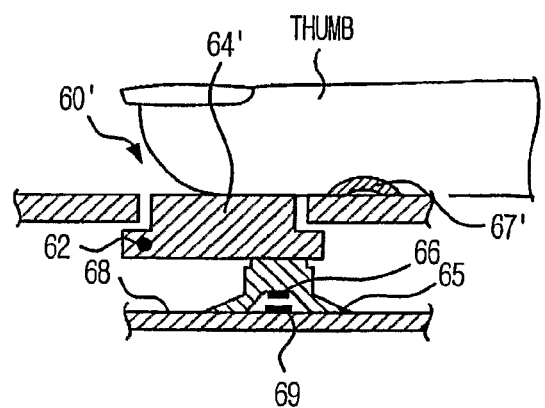
FIG. 14B is a sectional view illustrating the relationship between the driver's thumb and one of the steering wheel switches currently activated.

FIG. 14A is a view showing a condition that a driver is activating the steering wheel switches 60' of the steering wheel 10' in a regular good posture, and FIG. 14B is a sectional view illustrating the relationship between a thumb and the steering wheel switch 60' currently activated.

In the present embodiment, as set forth above, the touch sensor 67' is arranged adjacent to the corresponding steering wheel switch 60 at the outer periphery side of the steering wheel 10'. Accordingly, as illustrated in FIGS. 14A and 14B, when a driver activates one arbitrary steering wheel switch 60', the driver's thumb necessarily touches the touch sensor 67' corresponding to the steering wheel switch 60'. In the illustrated example, if the driver's thumb is stretched in a radial direction of the steering wheel 10' toward an operating position of the "VIEW" switch, the touch sensor 67' adjacent to the "VIEW" switch is necessarily touched by a part of the driver's thumb. Thus, unlike the first embodiment described above, there is no need to install the touch sensor 67 on the movable operating member 64 of the steering wheel switch 60. This makes it possible to simplify a wiring line structure for extracting the contact detection signal of the touch sensor 67', as compared to the configuration of the first embodiment set forth above. Furthermore, as illustrated in FIG. 13, the touch sensor 67' can be constructed from a contact sensing electrode, which makes it possible to provide a contact detection means in a cost-effective manner, as compared to a capacitance sensor.

FIG. 15 is a view showing one example of the display part 40' in accordance with the present embodiment. In the example illustrated in FIG. 15, the display part 40' includes a display panel and a backlight arranged on an instrument panel or within a meter cluster panel. On the display panel of the display part 40', there are provided function icons (individual function icons) in a one-to-one correspondence relationship with the respective steering wheel switches 60'. As with various indicators of a typical meter cluster panel, the function icons are turned on/off by means of a backlight into varying conditions of visibility. The function icons may be of the type fixedly secured to the display panel by printing or other suitable means. In this case, it becomes possible to implement function icons requiring no backlight. In case of employing the fixed type function icons, it is preferred that the function icons are coated with fluorescent paint or the like to enable the same to be visible at night with the aid of an ambient light.

As shown in FIG. 15, the function icons arranged in the same layout as that of the respective steering wheel switches 60'. As can be seen in FIGS. 12 and 15, the function icons may include letters or designs corresponding to the letters or designs drawn on the surfaces of the operating members 64' of the corresponding steering wheel switches 60'.

The indicators 50 are provided on the display part 40' in a one-to-one correspondence relationship with the steering wheel switches 60'. The indicators 50 are arranged adjacent to the function icons of the respective steering wheel switches 60'. In this example, as illustrated in FIG. 15, the indicators 50 are arranged at such positions as to adjoin the outer sides of the function icons of the respective steering wheel switches 60'. In other words, the indicators 50 are arranged with respect to the function icons of the respective steering wheel switches 60' in such a layout that corresponds to the positional relationship between the steering wheel switches 60' and the touch sensor 67'.

The indicators 50 are formed of, e.g., LEDs (light-emitting diodes), and the lighting condition thereof can be electrically controlled by the display control unit 70'. The indicators 50 are normally turned off and turned on when the steering wheel switches 60' are touched by the driver's thumb, as described later.

Figure 16:
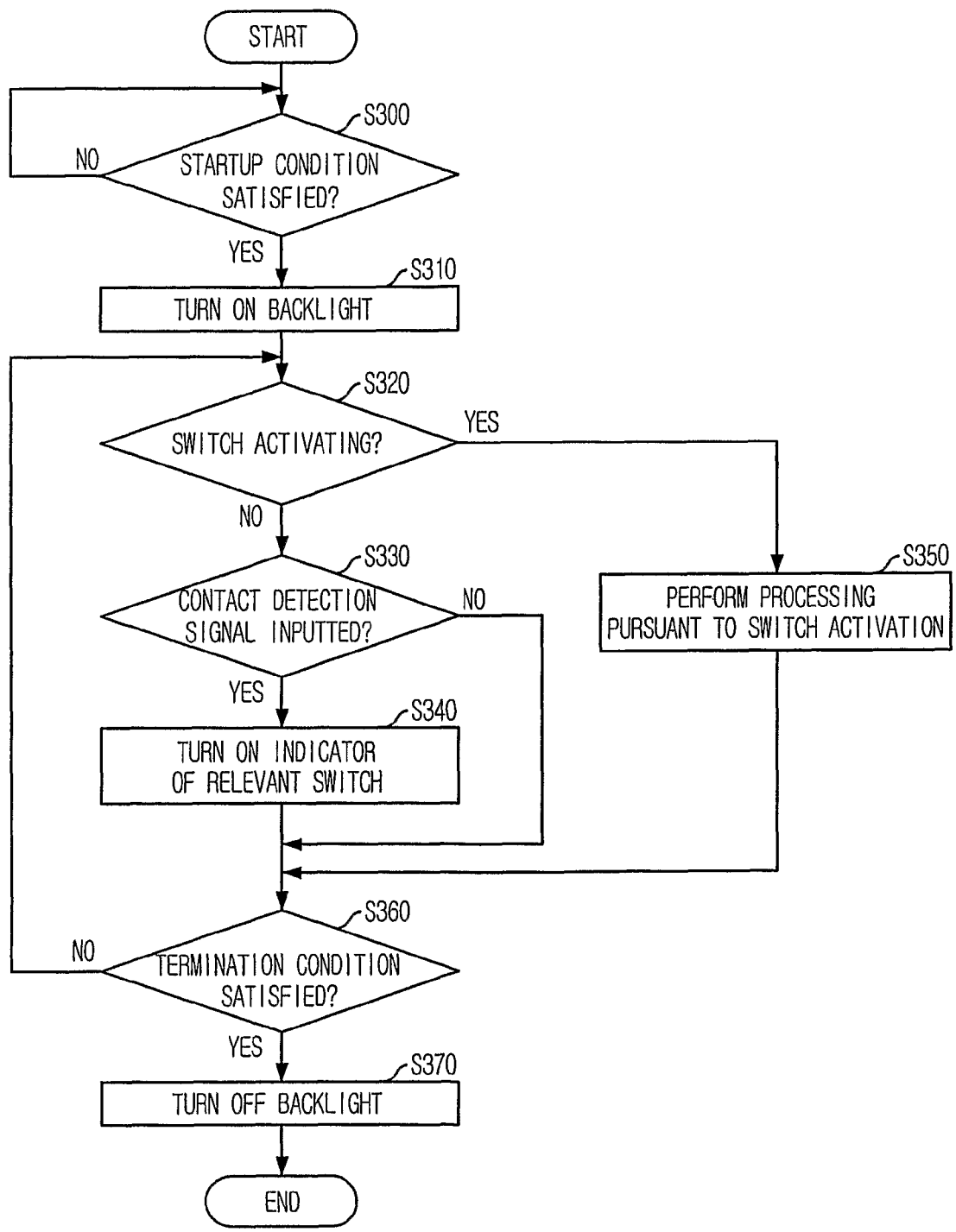
FIG. 16 is a flowchart illustrating the major processing performed by a display control unit in relation to a driver's thumb position relative to the steering wheel switches.

FIG. 16 is a flowchart illustrating a major processing performed by the display control unit 70' in relation to a driver's thumb position relative to the steering wheel switches 60'.

In step S300, it is determined whether a predetermined startup condition has been satisfied. The startup condition is satisfied if, for instance, the access or contact of a thumb to or with any of the steering wheel switches 60' is sensed. When the startup condition is satisfied, the flow proceeds to step S310.

In step S310, the backlight for the display panel of the display part 40' is turned on to thereby visualize various function icons on the display panel as illustrated in FIG. 15. This makes it possible to display the various function icons only when a user wishes to do so.

In step S320, it is determined whether the steering wheel switches 60' are being activated. The determination is made based on the presence or absence of a switch signal input from the steering wheel switches 60'. If steering wheel switches 60' are being activated (if the determination in step S320 is affirmative), the display control unit 70' controls a variety of vehicle-mounted equipment 80 through other ECUs in response to the switch signal input (step S350). In this case, satisfaction of a predetermined termination condition is determined in step S360. If the termination condition is not satisfied, the process returns to step S320. In case the termination condition is satisfied, the backlight for the display panel of the display part 40' is turned off (step S370) to thereby terminating the process. The predetermined termination condition may be satisfied if, for example, the access or contact of a thumb to or with any of the steering wheel switches 60' is not sensed for a predetermined period of time.

The flow proceeds to step S330 in case the steering wheel switches 60' are not being activated (if the determination in step S320 is negative).

In step S330, based on a contact detection signal input from time to time, the display control unit 70' determines whether the contact of a thumb with any of the steering wheel switches 60' is sensed at the present time. That is, it is determined whether the contact detection signal is input. In case no contact detection signal is input (if the determination in step S330 is negative), the indicators 50 currently kept in an on-state are turned off, if any, and satisfaction of the predetermined termination condition is determined in step S360. If the termination condition is not satisfied, the flow returns to step S320. In case the termination condition is satisfied, the backlight for the display panel of the display part 40' is turned off (step S370) to thereby terminate the processing.

On the other hand, if the contact detection signal is input (if the determination in step S330 is affirmative), the display control unit 70' turns on the indicator 50 corresponding to the steering wheel switch 60' touched by the thumb (step S340). As the indicator 50 is turned on, the function icon adjacent to that indicator, i.e., the function icon corresponding to the steering wheel switch 60' touched by the thumb is highlighted. For instance, if the driver's thumb is stretched toward an operating position of the "VIEW" switch as illustrated in FIGS. 14A and 14B, the touch sensor 67' adjacent to the "VIEW" switch is necessarily touched by a part of the thumb. In response, a contact detection signal is input from the touch sensor 67' thus touched, whereby the indicator 50 adjacent to the "VIEW" switch is turned on as illustrated in FIG. 15.

As described above, in accordance with the present embodiment, if one of the steering wheel switches 60' is touched by the driver's thumb, the function icon associated with the touched steering wheel switch 60' is highlighted by the turning-on of the corresponding indicator 50. Accordingly, the driver can easily comprehend, without having to directly look at the steering wheel switches 60' on the steering wheel 10', that the thumb is currently placed on the operating part 100' in a position for operation of the "VIEW" switch.

Moreover, in the present embodiment, as set forth earlier, the function icons are arranged in a layout corresponding to that of the steering wheel switches 60'. Thus, according to the present embodiment, the driver can learn the positional relationship between the function icon highlighted by the indicator 50 and the desired function icon to be activated next time, with no need to directly look at the steering wheel 10'. As a result, the driver can comprehend the positional relationship between the steering wheel switch 60' currently touched by the driver's thumb and the desired steering wheel switch 60' to be activated next time. Accordingly, the driver can activate the desired steering wheel switch 60' by moving his or her thumb toward that switch while looking at the display part 40'. In other words, it becomes possible to perform what is called a "blind-touch operation" that eliminates the need for the driver to look at the steering wheel 10'.

Although the foregoing description is centered on an instance that the "VIEW" switch is touched by a driver's thumb, this holds true for other steering wheel switches 60'.

Furthermore, in the present embodiment, various function icons are highlighted by turning on the indicators 50 lying adjacent to the highlighted function icons. Additionally or alternatively, LEDs may be provided in a corresponding relationship with the respective function icons so that the function icon corresponding to the steering wheel switch 60' touched by a driver's thumb can be highlighted using brightness, contrast, color or the like of the LEDs.

Figure 17:
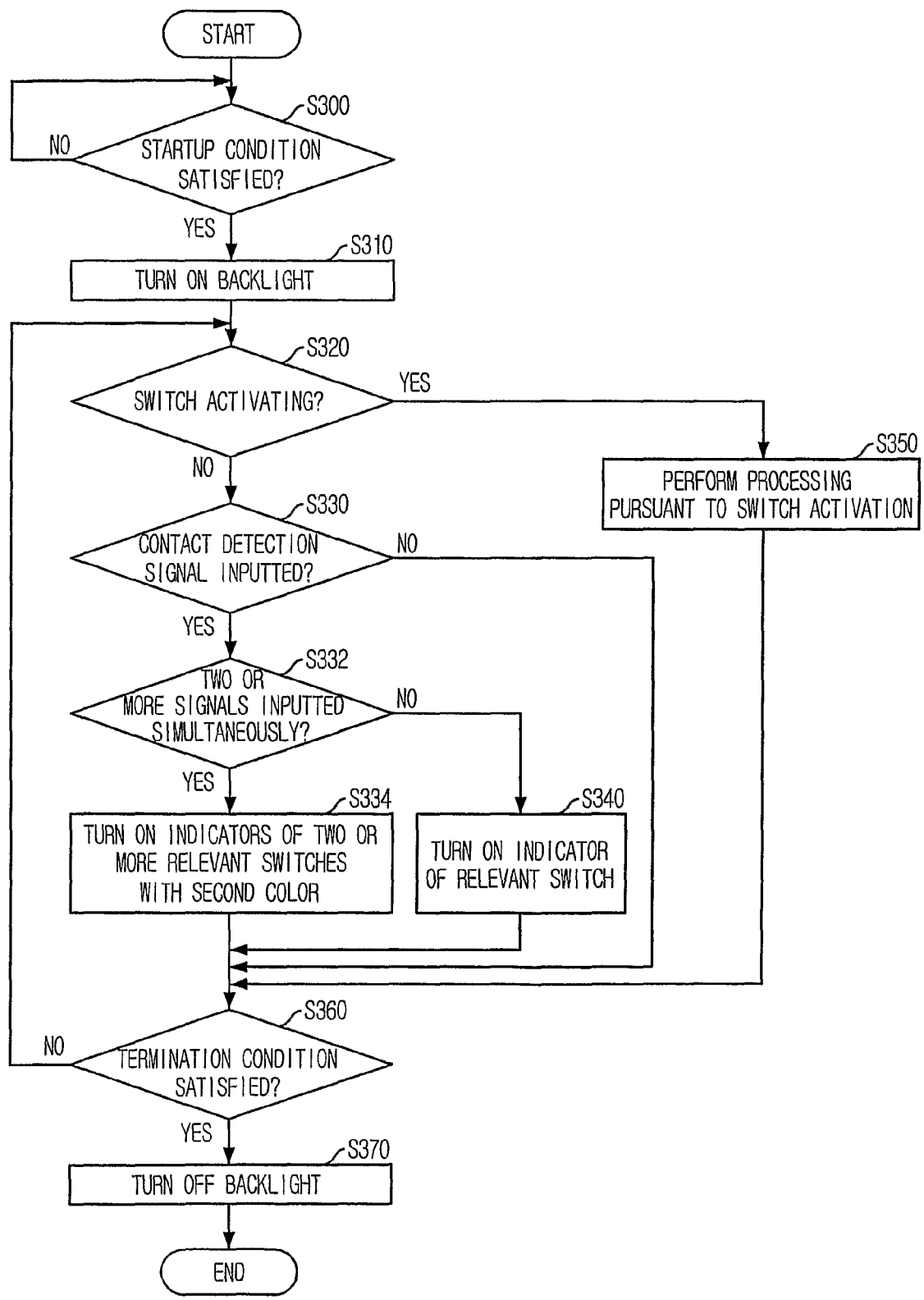
FIG. 17 is a flowchart illustrating another embodiment (a first modified embodiment) of the major processing performed by the display control unit.

FIG. 17 is a flowchart illustrating another embodiment of the major processing performed by the display control unit 70'. The processing illustrated in FIG. 17 differs from the processing shown in FIG. 16 in that two or more steering wheel switches 60' are simultaneously touched by a driver's thumb. The same processing steps as those shown in FIG. 16 will be designated by like reference numerals, with no description given in that regard.

In step S332, it is determined whether contact detection signals for two or more steering wheel switches 60' are simultaneously input. Step S340 is performed in case the determination reveals that two or more contact detection signals are not input simultaneously, i.e., if only one steering wheel switch 60' is touched by the driver's thumb. In this case, the display control unit 70' turns on, with a first color (e.g., blue color), the indicator 50 corresponding to the steering wheel switch 60' touched by the driver's thumb. On the other hand, the process proceeds to step 334 in case two or more contact detection signals are input simultaneously.

In step S334, the display control unit 70' turns on, with a second color (e.g., red color), the two or more indicators 50 corresponding to the steering wheel switches 60' touched by the driver's thumb.

Figure 18A:
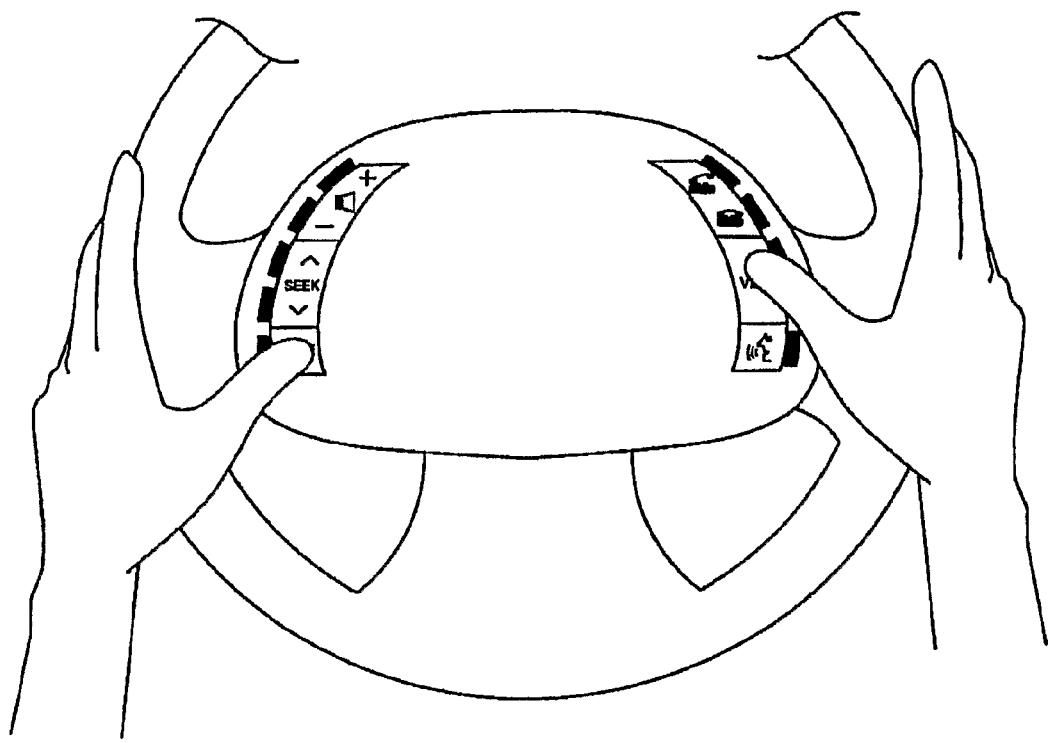
FIG. 18A is a view illustrating one exemplary situation where a driver is simultaneously touching two of the steering wheel switches.
Figure 18B:
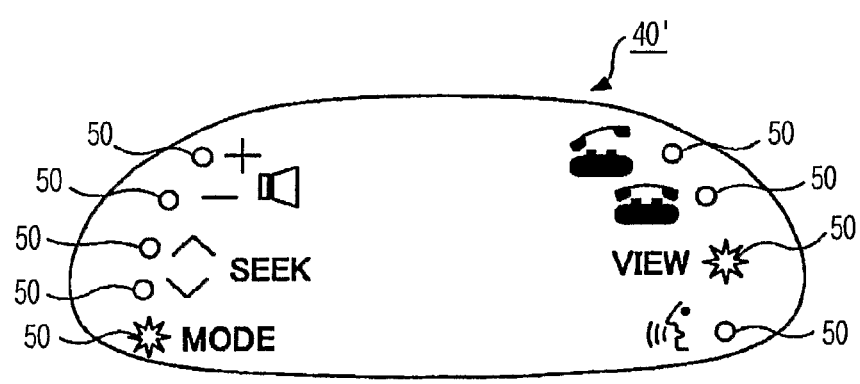
FIG. 18B is a view showing a condition of the display part at that time.

FIG. 18A illustrates one exemplary situation that a driver is simultaneously touching two of the steering wheel switches 60', and FIG. 18B shows a condition of the display part 40' at that time. In the example illustrated in FIG. 18A, the driver is simultaneously touches (but not activating) the steering wheel switch 60' ("MODE" switch) belonging to the left switch group 101' and the steering wheel switch 60' ("VIEW" switch) belonging to the right switch group 102'. Therefore, as illustrated in FIG. 18B, the two indicators 50 adjacent to the function icons for both the "MODE" switch and the "VIEW" switch are turned on with a color (not shown) differing from the color illustrated in FIG. 15.

In the meantime, the steering wheel switches 60' are arranged in such positions as to ensure that, while gripping the steering wheel 10', the driver can naturally activate the steering wheel switches 60' through a smooth hand motion. Normally, the driver performs switch activation with the steering wheel 10' gripped with his or her hands, for the reason of which the driver's thumbs are apt to touch undesired steering wheel switches 60'. For instance, despite the driver's intention to activate the steering wheel switches 60' of the left switch group 101' with his or her left thumb, it may be sometimes the case that the right thumb unintentionally touches the right switch group 102' at the same moment. On this occasion, if the right thumb is given a force together with the operation of the steering wheel 10' for example, there is a possibility that the functions of the steering wheel switches 60' belonging to the undesired switch group 102' are inadvertently performed against the driver's intention.

In contrast, according to the present embodiment, if two or more steering wheel switches 60' are simultaneously touched by the driver's thumbs, the indicators 50 corresponding to the steering wheel switches 60' touched by the driver's thumb are turned on with the second color, instead of the indicators 50 associated with one of the steering wheel switches 60' being turned on with the first color. Thus, without having to directly look at the steering wheel 10', the driver can comprehend that his or her thumbs are currently touching two or more steering wheel switches 60', by perceiving occurrence of such an event that, despite the driver's touching the steering wheel switches 60', one of the indicators 50 is not turned on with the first color or two or more indicators 50 are turned on with the second color. This enables the driver to change the thumb position or take other measures, thereby preventing unwanted switch activation from happening.

In the present embodiment, by changing the lighting color of the indicators 50, the driver is enabled to discriminate between the condition that two or more steering wheel switches 60' are touched by the driver's thumbs and the condition that one steering wheel switch 60' is touched by the driver's thumb. Alternatively or additionally, the brightness of the indicators 50 may be changed or the indicators 50 may be kept turned off when two or more steering wheel switches 60' are touched by the thumbs. Moreover, the indicators 50 may be turned on even when the steering wheel switches 60' are activated. In this case, it is preferred that the manner of turning on the indicators 50 differs from that available at the time of contact detection described above.

Figure 19:
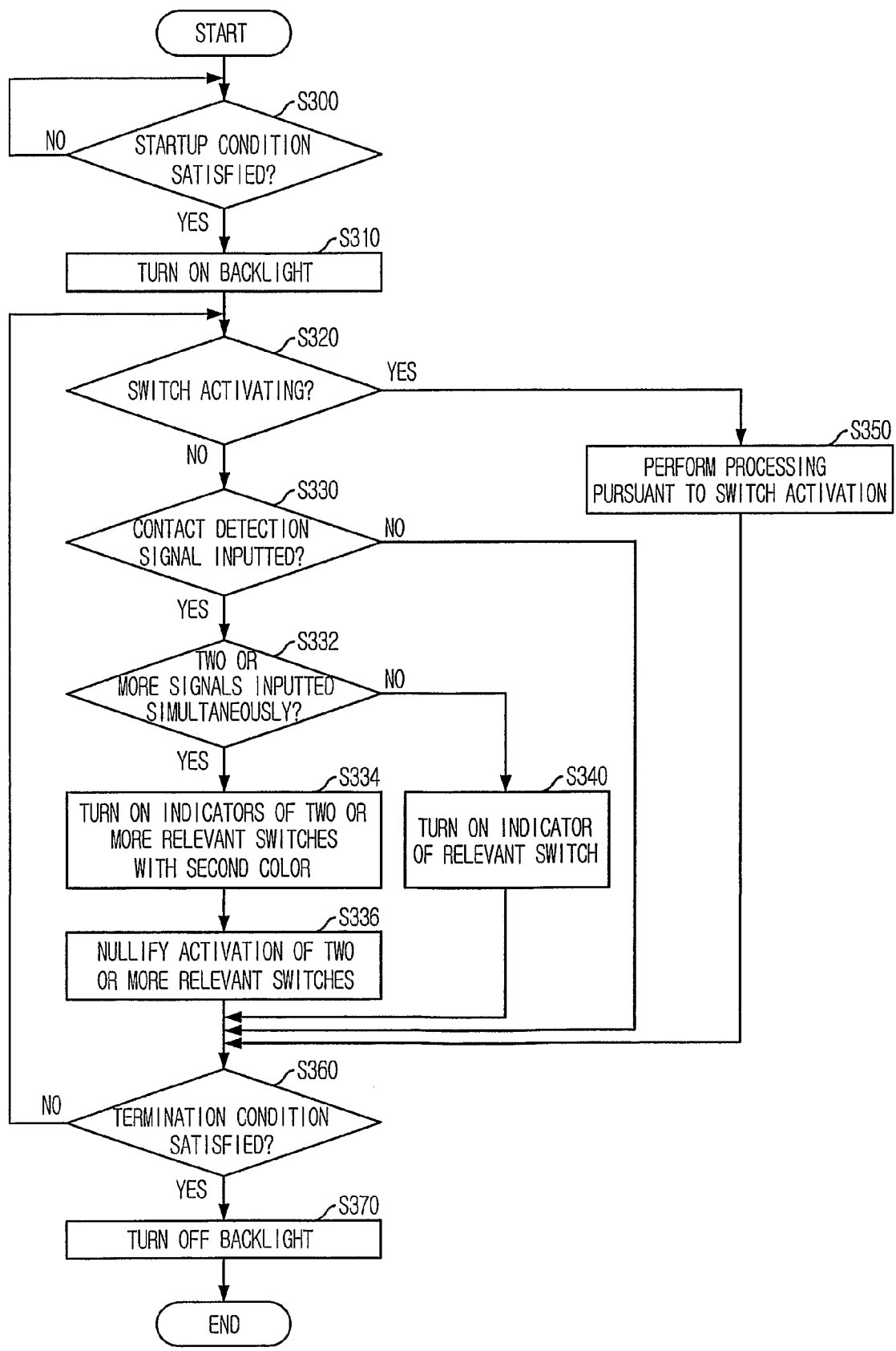
FIG. 19 is a flowchart illustrating a further embodiment (a second modified embodiment) of the major processing performed by the display control unit.

FIG. 19 is a flowchart illustrating a further embodiment of the major processing performed by the display control unit 70'. The processing illustrated in FIG. 19 differs from the processing shown in FIG. 17 in that, if the driver's thumb is simultaneously touching two or more steering wheel switches 60', the driver's activation of the switches is nullified. The same processing steps as those shown in FIG. 17 will be designated by like reference numerals, with no description given in that regard.

In step S336, the display control unit 70' nullifies the driver's activation for the two or more steering wheel switches 60' touched by his or her thumb. Thus, even if one of the two or more steering wheel switches 60' is activated by the driver at a later time and hence the determination made in step S320 becomes affirmative, the operation (function) corresponding to the steering wheel switch 60' thus activated is not performed in step S350. Such a nullification task may be performed by, e.g., not executing the processing for the switch signals (generated at the time of switch activation) from the two or more steering wheel switches 60'. The nullification may be released when the driver's thumb is out of touch with the two or more steering wheel switches 60'.

As set forth above, the driver activates the switch with the steering wheel 10' gripped with his or her hands, for the reason of which the driver's thumbs are apt to touch undesired steering wheel switches 60' when rotating the steering wheel 10'. On this occasion, if the right thumb is given a force together with the steering operation of the steering wheel 10' for example, there is a possibility that the undesired steering wheel switches 60' are activated to thereby perform the functions thereof against the driver's intention.

In contrast, according to the present embodiment, if two or more steering wheel switches 60' are simultaneously touched by the driver's thumbs, the activation for the steering wheel switches 60' is nullified. Thus, even when the driver has erroneously pressed down, together with the steering operation for the steering wheel 10', the undesired one of the two or more steering wheel switches 60' currently touched by the driver's thumbs, the operation associated therewith is not performed, which makes it possible to prevent unwanted driver's switch activation from happening.

From the same view point as described above, only while the indicator 50 is turned on with the first color, the display control unit 70' of the present embodiment may allow activation of the steering wheel switch 60' corresponding to the indicator 50. In this case, activation of a specific steering wheel switch 60' is permitted only when the indicator 50 has been turned on. Thus, when the indicator 50 is not yet turned on, even if the driver has erroneously pressed down, together with the steering operation for the steering wheel 10', the undesired one of the two or more steering wheel switches 60' currently touched by the driver's thumbs, the operation associated therewith is not performed, which makes it possible to prevent unwanted driver's switch activation from happening.

While example embodiments of the invention have been described in detail, it will be understood by those skilled in the art that the present invention is not limited to the foregoing embodiments but various changes and modifications may be made without departing from the scope of the invention as defined in the claims.

As a specific example, in contrast with the foregoing embodiments in which, for the entire steering wheel switches 60 or 60' arranged on the steering wheel 10 or 10', the function icons are allotted in a layout corresponding to the layout of the respective steering wheel switches 60 or 60', the function icons for some special switches among the multiple number of steering wheel switches 60 or 60' may be arranged in a non-corresponding positional relationship or may be omitted.

Furthermore, in the first embodiment described above, the generic function icons and the individual function icons are interchangeably displayed in view of the fact that the steering wheel switches 60 are arranged in multiple numbers. However, in case a relatively small number of steering wheel switches 60' are employed as in the second embodiment, the individual function icons may be displayed in a normal display condition. In this case, if the contact of the driver's thumb with one of the steering wheel switches 60' is sensed, the individual function icon associated with the steering wheel switch 60' may be enlarged as it is. Thus, the driver can easily comprehend that his or her thumb is currently touching the steering wheel switch 60'. Alternatively or additionally, if the contact of the driver's thumb with one of the steering wheel switches 60' is sensed, the individual function icon associated with the steering wheel switch 60' may be displayed in a highlighted condition. In this case, the driver can also easily comprehend that his or her thumb is currently touching the steering wheel switch 60'.

In accordance with the present invention, a driver can quickly learn the positional relationship between the driver's thumb and each of the steering wheel switches in an operating device having a plurality of steering wheel switches.

While the invention has been shown and described with respect to the preferred embodiments, it will be understood by those skilled in the art that various changes and modification may be made without departing from the spirit and scope of the invention as defined in the following claims.

The invention claimed is:

1. An operating device comprising:
a plurality of steering wheel switches provided on a steering wheel;
a display unit in which function icons representing functions of the steering wheel switches are arranged in a substantially same layout as the steering wheel switches; and
a contact detection device that detects contact or access of a driver's finger to the steering wheel switches,
wherein, if the contact detection device detects the contact or access of the driver's finger with one of the steering wheel switches, the function icon associated with the one steering wheel switch is highlighted,
wherein the function icons include generic function icons assigned, in one-to-one correspondence to switch groups, each of the switch groups including of a plurality of the steering wheel switches and each of the generic function icons showing a representative function of the steering wheel switches belonging to one and the same switch group,
wherein the function icons are arranged in the substantially same layout as the switch groups,
wherein, if the contact or access of the driver's finger with one of the steering wheel switches belonging to one of the switch groups is detected by the contact detection device, the function icon associated with the one switch group changes from the generic function icon to an individual function icon representing functions of the steering wheel switches belonging to the one switch group,
wherein the function icons include icons displayed in a variably controllable condition, and
wherein the function icon associated with the steering wheel switch for which the contact or access by the driver's finger is detected is differently highlighted when the contact or access of the driver's finger to one of the steering wheel switches is detected and when the contact or access by the driver's finger with respect to two or more of the steering wheel switches belonging to two or more of the switch groups is detected.

2. The operating device according to claim 1,
wherein the function icons include icons displayed in a variably controllable condition, and
wherein the function icon associated with the steering wheel switch, for which the contact or access by the driver's finger is detected, that is displayed on the display unit is enlarged.

3. The operating device according to claim 1,
wherein each of the switch groups is formed by arranging a plurality of the steering wheel switches associated with the same or relevant application in close proximity to each other.

4. The operating device according to claim 1,
wherein the contact detection device is provided on an operating member of each of the steering wheel switches in a one-to-one correspondence relationship with the steering wheel switches.

5. The operating device according to claim 1,
wherein, when the contact or access by the driver's finger to two or more of the steering wheel switches is detected, activation of the steering wheel switches, for which the contact or access by the driver's finger is detected, is nullified.

6. An operating device comprising:
a plurality of steering wheel switches provided on a steering wheel;
a display unit in which function icons representing functions of the steering wheel switches are arranged in a substantially same layout as the steering wheel switches; and
a contact detection device that detects contact or access of a driver's finger to the steering wheel switches,
wherein, if the contact detection device detects the contact or access of the driver's finger with one of the steering wheel switches, the function icon associated with the one steering wheel switch is highlighted, and
wherein the contact detection device is provided on an operating member of each of the steering wheel switches in a one-to-one correspondence relationship with the steering wheel switches.

7. The operating device according to claim 6,
wherein the function icons include icons displayed in a variably controllable condition, and
wherein the function icon associated with the steering wheel switch, for which the contact or access by the driver's finger is detected, that is displayed on the display unit is enlarged.

8. The operating device according to claim 6,
wherein the function icons include icons displayed in a variably controllable condition,
wherein the function icons include generic function icons assigned, in one-to-one correspondence, to switch groups, each of the switch groups including of a plurality of the steering wheel switches and each of the generic function icons showing a representative function of the steering wheel switches belonging to one and the same switch group,
wherein the function icons are arranged in the substantially same layout as the switch groups, and
wherein, if the contact or access of the driver's finger with one of the steering wheel switches belonging to one of the switch groups is detected by the contact detection device, the function icon associated with the one switch group changes from the generic function icon to an individual function icon representing functions of the steering wheel switches belonging to the one switch group.

9. The operating device according to claim 8,
wherein each of the switch groups is formed by arranging a plurality of the steering wheel switches associated with the same or relevant application in close proximity to each other.

10. An operating device comprising:
a plurality of steering wheel switches provided on a steering wheel;
a display unit in which function icons representing functions of the steering wheel switches are arranged in a substantially same layout as the steering wheel switches; and a contact detection device that detects contact or access of a driver's finger to the steering wheel switches, wherein, if the contact detection device detects the contact or access of the driver's finger with one of the steering wheel switches, the function icon associated with the one steering wheel switch is highlighted, and wherein the contact detection device is provided adjacent to an operating member of each of the steering wheel switches in a one-to-one correspondence relationship with the steering wheel switches.

11. The operating device according to claim 10, wherein the contact detection device adjoins a corresponding one of the steering wheel switches at a periphery of the steering wheel.

12. The operating device according to claim 10, wherein the function icon associated with the steering wheel switch, for which the contact or access by the driver's finger is detected, is highlighted by turning on an indicator provided adjacent to the function icon.

13. The operating device according to claim 12, wherein the indicator associated with the steering wheel switch for which the contact or access by the driver's finger is detected is differently turned on when the contact or access by the driver's finger to one of the steering wheel switches and when the contact or access by the driver's finger to two or more of the steering wheel switches is detected.

14. The operating device according to claim 13, wherein, when the contact or access by the driver's finger to two or more of the steering wheel switches is detected, activation of the steering wheel switches, for which the contact or access by the driver's finger is detected, is nullified.

15. An operating device comprising:

a plurality of steering wheel switches provided on a steering wheel;

a display unit in which function icons representing functions of the steering wheel switches are arranged in a substantially same layout as the steering wheel switches; and a contact detection device that detects contact or access of a driver's finger to the steering wheel switches, wherein, if the contact detection device detects the contact or access of the driver's finger with one of the steering wheel switches, the function icon associated with the one steering wheel switch is highlighted, wherein the function icons include icons displayed in a variably controllable condition, and wherein the function icon associated with the steering wheel switch for which the contact or access by the driver's finger is detected is differently highlighted when the contact or access by the driver's finger to one of the steering wheel switches is detected and when the contact or access by the driver's finger to two or more of the steering wheel switches is detected.

16. The operating device according to claim 15, wherein the contact detection device is provided on an operating member of each of the steering wheel switches in a one-to-one correspondence relationship with the steering wheel switches.

17. The operating device according to claim 16, wherein, when the contact or access by the driver's finger to two or more of the steering wheel switches is detected, activation of the steering wheel switches, for which the contact or access by the driver's finger is detected, is nullified.

18. An operating device comprising:

a plurality of steering wheel switches provided on a steering wheel;

a display unit in which function icons representing functions of the steering wheel switches are arranged in a substantially same layout as the steering wheel switches; and a contact detection device that detects contact or access of a driver's finger to the steering wheel switches, wherein, if the contact detection device detects the contact or access of the driver's finger with one of the steering wheel switches, the function icon associated with the one steering wheel switch is highlighted, wherein the function icons include generic function icons assigned, in one-to-one correspondence, to switch groups, each of the switch groups including a plurality of the steering wheel switches and each of the generic function icons showing a representative function of the steering wheel switches belonging to one and the same switch group, wherein the function icons are arranged in the substantially same layout as the switch groups, wherein, if the contact or access of the driver's finger with one of the steering wheel switches belonging to one of the switch groups is detected by the contact detection device, the function icon associated with the one switch group changes from the generic function icon to an individual function icon representing functions of the steering wheel switches belonging to the one switch group, and wherein the individual function icon includes function-identifying subdivisions representing the functions of the steering wheel switches in the substantially same layout as the corresponding steering wheel switches.

19. The operating device according to claim 18, wherein the function icons include icons displayed in a variably controllable condition, and wherein the function icon associated with the steering wheel switch for which the contact or access by the driver's finger is detected is differently highlighted when the contact or access of the driver's finger to one of the steering wheel switches is detected and when the contact or access by the driver's finger with respect to two or more of the steering wheel switches belonging to two or more of the switch groups is detected.

20. The operating device according to claim 19, wherein, when the contact or access by the driver's finger to two or more of the steering wheel switches is detected, activation of the steering wheel switches, for which the contact or access by the driver's finger is detected, is nullified.

21. The operating device according to claim 18, wherein the contact detection device is provided on an operating member of each of the steering wheel switches in a one-to-one correspondence relationship with the steering wheel switches.

22. The operating device according to claim 18, wherein the function icons include icons displayed in a variably controllable condition, and wherein the function icon associated with the steering wheel switch, for which the contact or access by the driver's finger is detected, that is displayed on the display unit is enlarged.

23. The operating device according to claim 18,
wherein each of the switch groups is formed by arranging a plurality of the steering wheel switches associated with the same or relevant application in close proximity to each other.

24. The operating device according to claim 18,
wherein the individual function icon is configured such that the function-identifying subdivision corresponding to the steering wheel switch, for which the contact or access by the driver's finger is detected by the contact detection device, is highlighted.

25. An operating device comprising:
an operation device including:
- a plurality of switches and provided in a passenger compartment;
- a display part in which function icons representing functions of the switches are arranged in a substantially same layout as the switches;
- a contact detection device that detects contact or access of a finger to the switches; and
- a display control device that controls the display part to highlight the function icon associated with the one switch, when the contact or access by the driver's finger to one of the switches is detected by the contact detection device, wherein the function icons include generic function icons assigned, in one-to-one correspondence, to switch groups, each of the switch groups including of a plurality of the switches and each of the generic function icons showing a representative function of the steering wheel switches belonging to one and the same switch group, wherein the function icons are arranged in the substantially same layout as the switch, wherein, if the contact or access by the driver's finger to one of the switches belonging to one of the switch groups is detected by the contact detection device, the display control device controls the display part to change the function icon associated with the one switch group from the generic function icon to an individual function icon representing functions of the switches belonging to the one switch group, and wherein the display control device controls the display part to differently highlight the function icon associated with the switch, for which the contact or access by the driver's finger is detected, when the contact or access by the driver's finger to one of the switches is detected and when the contact or access by the driver's finger to two or more of the switches is detected.

* * * * *